(12) United States Patent
Takayama et al.

(10) Patent No.: US 10,182,186 B2
(45) Date of Patent: Jan. 15, 2019

(54) IMAGE CAPTURING APPARATUS AND CONTROL METHOD THEREOF

(71) Applicant: CANON KABUSHIKI KAISHA, Tokyo (JP)

(72) Inventors: Kazunori Takayama, Hachioji (JP); Toshihiro Mochizuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/487,605

(22) Filed: Apr. 14, 2017

(65) Prior Publication Data

US 2017/0310879 A1   Oct. 26, 2017

(30) Foreign Application Priority Data

Apr. 22, 2016 (JP) .................................. 2016-086574

(51) Int. Cl.
*H04N 5/232* (2006.01)
*G06T 7/70* (2017.01)

(52) U.S. Cl.
CPC ........... *H04N 5/23212* (2013.01); *G06T 7/70* (2017.01)

(58) Field of Classification Search
CPC ............................... H04N 5/23212; G06T 7/70
See application file for complete search history.

(56) References Cited

U.S. PATENT DOCUMENTS

| 8,159,580 | B2 | 4/2012 | Suzuki et al. | |
| 8,830,354 | B2 | 9/2014 | Nakaoka | |
| 2006/0203085 | A1* | 9/2006 | Tomita | H04N 13/0018 348/51 |
| 2011/0175857 | A1* | 7/2011 | Kim | G02B 27/2214 345/204 |
| 2013/0229409 | A1* | 9/2013 | Song | H04N 13/0029 345/419 |
| 2015/0241205 | A1 | 8/2015 | Nobayashi | |

FOREIGN PATENT DOCUMENTS

| JP | 2007-325139 A | 12/2007 |
| JP | 2012-155095 A | 8/2012 |
| JP | 2014-074891 A | 4/2014 |

OTHER PUBLICATIONS

U.S. Appl. No. 15/486,879, filed Apr. 13, 2017 (Mochizuki et al.).
U.S. Appl. No. 15/486,851, filed Apr. 13, 2017 (Takayama et al.).

* cited by examiner

*Primary Examiner* — Ahmed A Berhan
(74) *Attorney, Agent, or Firm* — Venable LLP

(57) ABSTRACT

An image capturing apparatus reads out a signal from pixels of the image sensor, sets a region in which a plurality of signals having different viewpoints are read out from each pixel of an image sensor, acquires first depth information for detecting an object using a signal that has been read out from a first region, acquires second depth information for detecting a focus state of the object using a signal that has been read out from a second region, and variably controls a ratio of screens in which the first region is set and a ratio of screens in which the second region is set.

20 Claims, 18 Drawing Sheets

FIG. 2

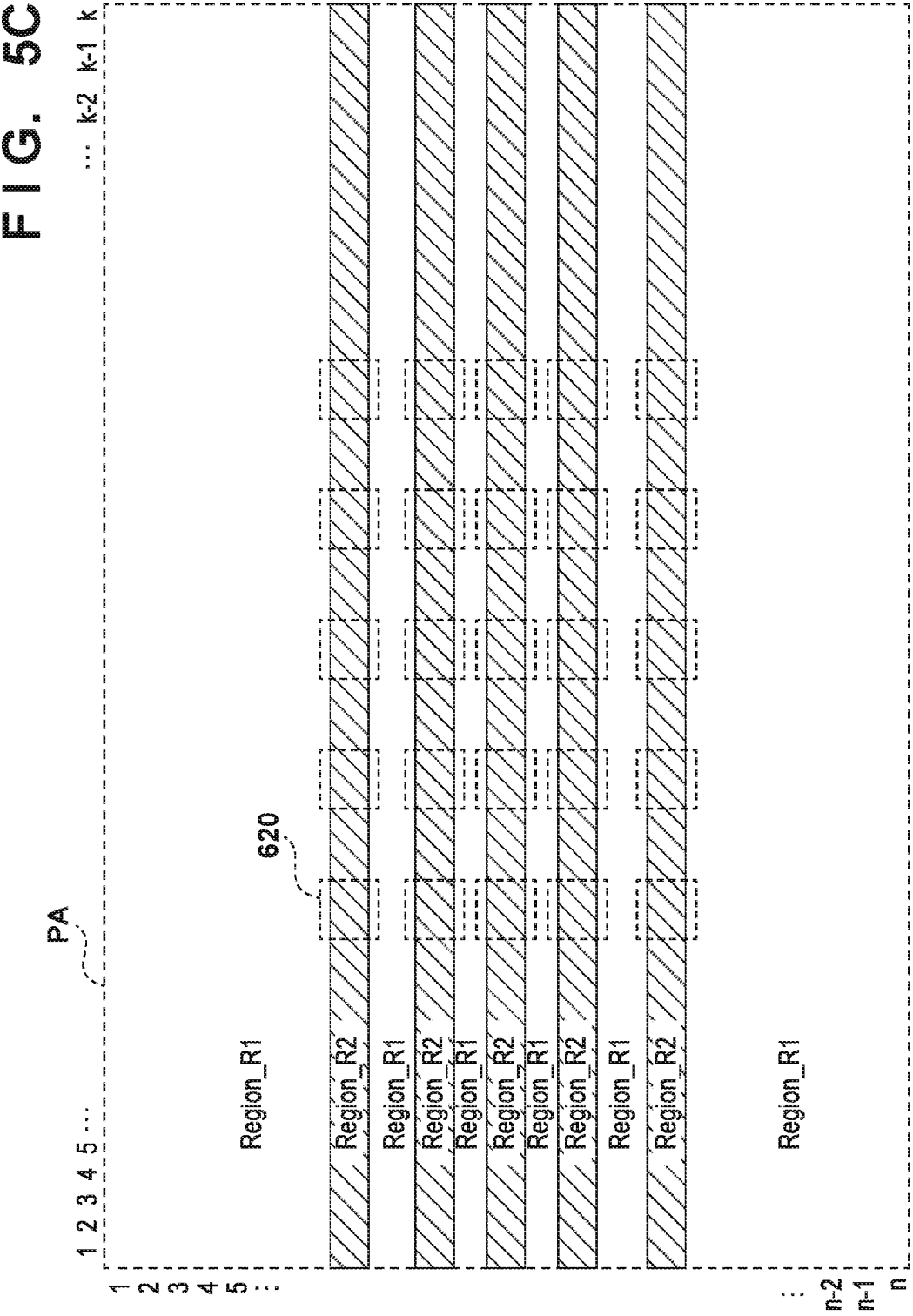

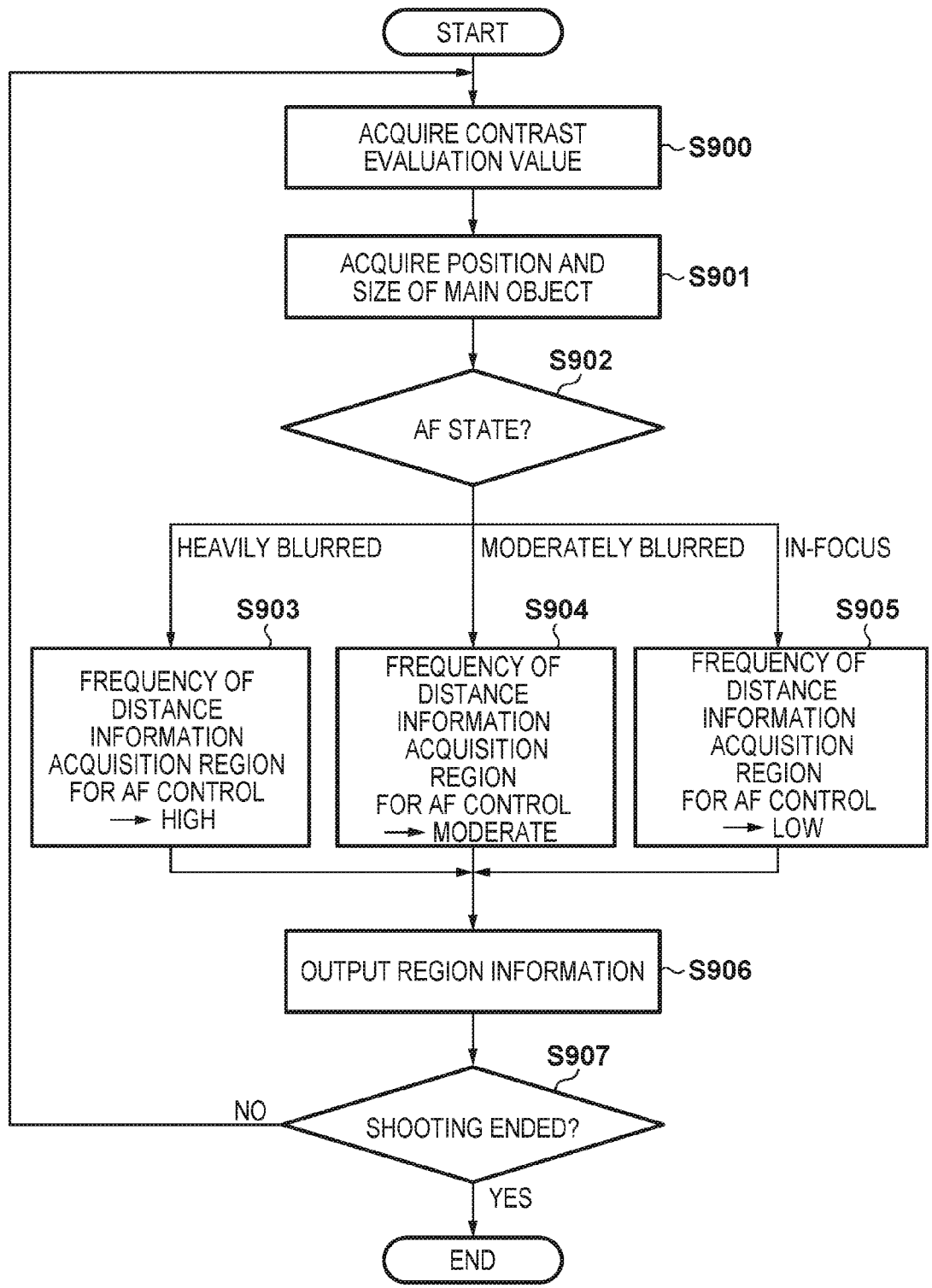

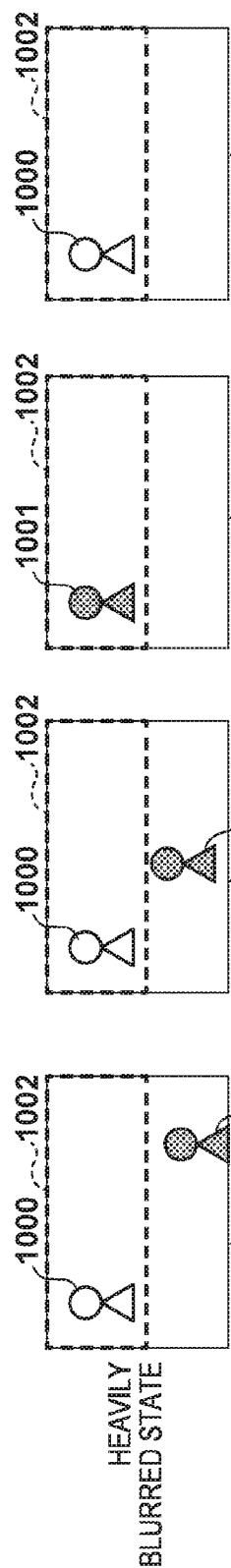
FIG. 10A HEAVILY BLURRED STATE
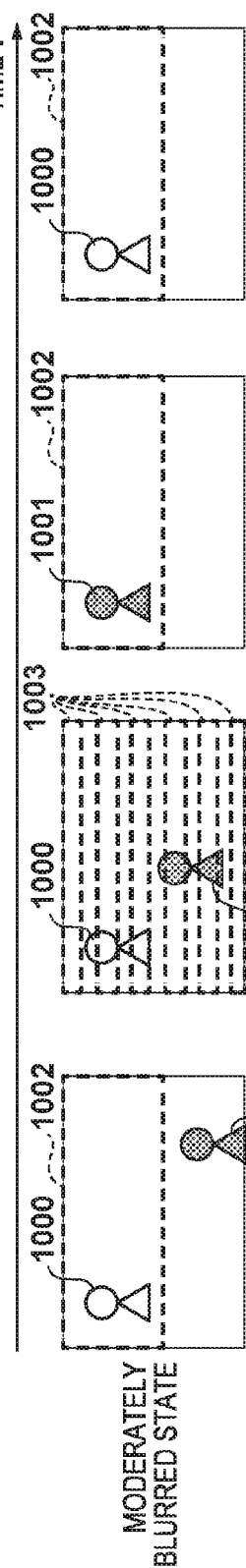
FIG. 10B MODERATELY BLURRED STATE
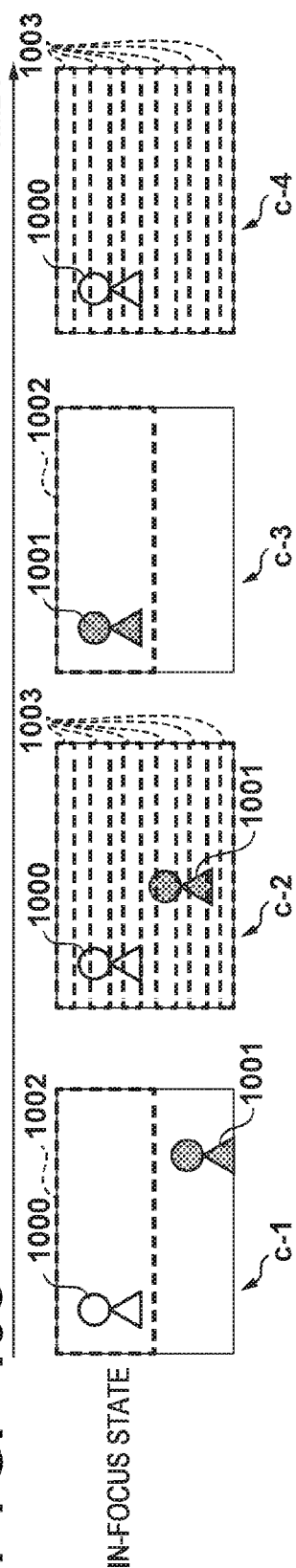
FIG. 10C IN-FOCUS STATE

IMAGE SIGNALS AND DISTANCE INFORMATION ACQUISITION REGION FOR AF CONTROL

DISTANCE MAP ACQUIRED FROM DISTANCE INFORMATION ACQUISITION REGION FOR AF CONTROL

IMAGE SIGNALS AND DISTANCE INFORMATION ACQUISITION REGION FOR OBJECT DETECTION

DISTANCE MAP ACQUIRED FROM DISTANCE INFORMATION ACQUISITION REGION FOR OBJECT DETECTION

IMAGE CAPTURING APPARATUS AND CONTROL METHOD THEREOF

BACKGROUND OF THE INVENTION

Field of the Invention

The present invention relates to an image capturing apparatus that performs focus adjustment and object detection.

Description of the Related Art

Conventionally, techniques for performing focus detection based on the phase difference of image signals acquired by an image sensor that has pupil-divided pixels using a microlens are known (Japanese Patent Laid-Open No. 2007-325139). In Japanese Patent Laid-Open No. 2007-325139, each pupil-divided pixel receives, via the microlens, light beams that have passed through different pupil regions of an imaging optical system. Also, image signals can be acquired by adding together image signals.

In focus detection by a phase difference method as described above, determining the amount of image signals that are to be read out for focus adjustment and subjected to calculation processing is a very important factor in terms of the detection accuracy and the processing speed. In addition, in the case of an image sensor in which each pixel is divided into two, if all the image signals are taken in, the data amount will be twice the data amount of data for a captured image, placing a large load on later-stage processing circuits.

In view of this, image capturing apparatuses have been proposed in which a distance information acquisition region for focus adjustment can be suitably set in the image sensor, and the time for reading out image signals from the image sensor is reduced (Japanese Patent Laid-Open No. 2012-155095). Also, image capturing apparatuses that can generate the distribution of the distances (a distance map) of objects in an image using image signals acquired from a distance information acquisition region for focus adjustment have been proposed (Japanese Patent Laid-Open No. 2014-074891). By using the distance map of Japanese Patent Laid-Open No. 2014-074891, distance information of a main object and another object in the image is acquired, and the main object can be detected in cases such as where the main object and the other object pass each other.

However, in the above-described conventional techniques, the distance information acquisition region for focus adjustment and the distance information acquisition region for object detection do not necessarily match, and thus there is a possibility that, if one of the regions is focused on, accuracy for the other region deteriorates.

SUMMARY OF THE INVENTION

The present invention has been made in consideration of the aforementioned problems, and makes it possible to ensure both focus adjustment accuracy and object detection accuracy.

In order to solve the aforementioned problems, the present invention provides an image capturing apparatus comprising: an image sensor; a readout unit configured to read out a signal from pixels of the image sensor; a setting unit configured to set a region in which a plurality of signals having different viewpoints are read out from each pixel of the image sensor by the readout unit; a first information acquisition unit configured to acquire first depth information for detecting an object using a signal that has been read out from a first region set by the setting unit; a second information acquisition unit configured to acquire second depth information for detecting a focus state of the object using a signal that has been read out from a second region set by the setting unit; and a control unit configured to variably control a ratio of screens in which the first region is set by the setting unit and a ratio of screens in which the second region is set.

In order to solve the aforementioned problems, the present invention provides an image capturing apparatus comprising: an image sensor; a readout unit configured to read out a signal from pixels of the image sensor; a setting unit configured to set a region in which a plurality of signals having different viewpoints are read out from each pixel of the image sensor by the readout unit; a first information acquisition unit configured to acquire first depth information for detecting an object using a signal that has been read out from a first region set by the setting unit; a second information acquisition unit configured to acquire second depth information for detecting a focus state of the object using a signal that has been read out from a second region set by the setting unit; and a control unit configured to variably control ratios of an entire screen occupied by the first region and the second region set by the setting unit.

In order to solve the aforementioned problems, the present invention provides a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal that has been read out from a first region set by the setting unit; acquiring second depth information for detecting a focus state of the object using a signal that has been read out from a second region set by the setting unit; and variably controlling a ratio of screens in which the first region is set by the setting unit and a ratio of screens in which the second region is set.

In order to solve the aforementioned problems, the present invention provides a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal that has been read out from a first region set by the setting unit; acquiring second depth information for detecting a focus state of the object using a signal that has been read out from a second region set by the setting unit; and variably controlling ratios of an entire screen occupied by the first region and the second region set by the setting unit.

In order to solve the aforementioned problems, the present invention provides a computer-readable storage medium storing a program for causing a computer to execute a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal that has been read out from a first region set by the setting unit; acquiring second depth information for detecting a focus state of the object using a signal that has been read out from a second region set by the setting unit;

and variably controlling a ratio of screens in which the first region is set by the setting unit and a ratio of screens in which the second region is set.

In order to solve the aforementioned problems, the present invention provides a computer-readable storage medium storing a program for causing a computer to execute a control method of an image capturing apparatus which has an image sensor, a readout unit configured to read out a signal from pixels of the image sensor, and a setting unit configured to set a region in which a plurality of signals having different viewpoints are read out from each pixel of the image sensor by the readout unit, the method comprising: acquiring first depth information for detecting an object using a signal that has been read out from a first region set by the setting unit; acquiring second depth information for detecting a focus state of the object using a signal that has been read out from a second region set by the setting unit; and variably controlling ratios of an entire screen occupied by the first region and the second region set by the setting unit.

According to the present invention, both focus adjustment accuracy and object detection accuracy can be ensured.

Further features of the present invention will become apparent from the following description of exemplary embodiments (with reference to the attached drawings).

BRIEF DESCRIPTION OF THE DRAWINGS

FIG. 2 is a diagram schematically showing the pixel arrangement of an image sensor of the embodiments.

FIG. 5C is a diagram showing a focus detection frame that is set for the pixel array of the image sensor of the embodiments.

FIG. 9 is a flowchart showing processing for setting a distance information acquisition region performed by a distance information acquisition region setting unit of the first embodiment.

FIGS. 10A to 10C are diagrams illustrating distance information acquisition regions that are set by the region setting unit of the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Description of Background

First, the background of embodiments of the present invention will be specifically described with reference to FIGS. 16A to 16C.

Figure 16A:
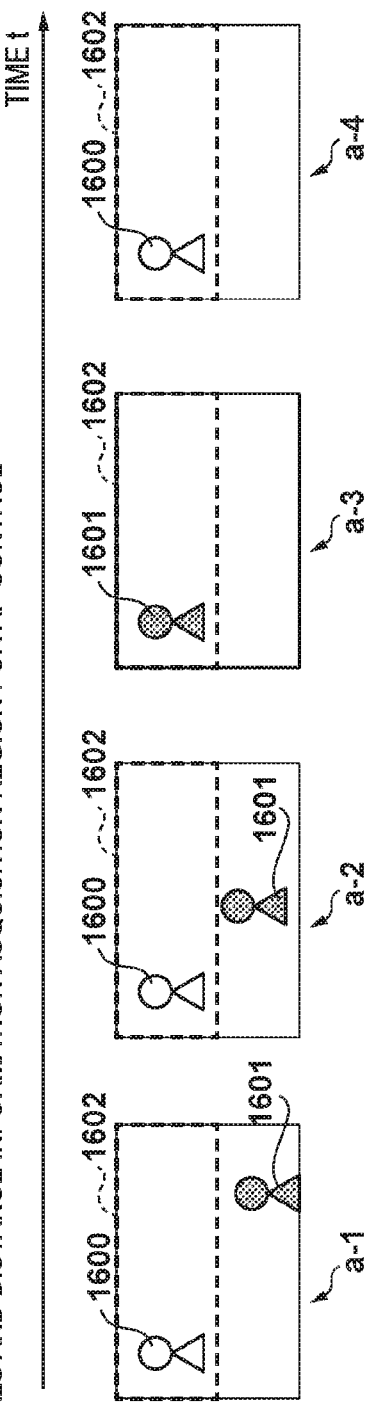
FIGS. 16A to 16D are diagrams illustrating the background of the embodiments.
Figure 16B:
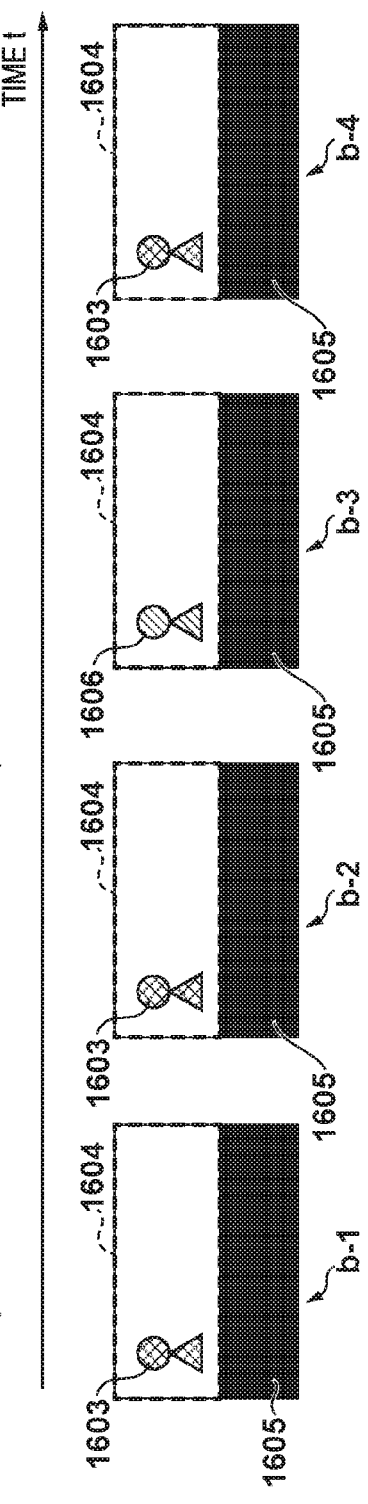
Figure 16C:
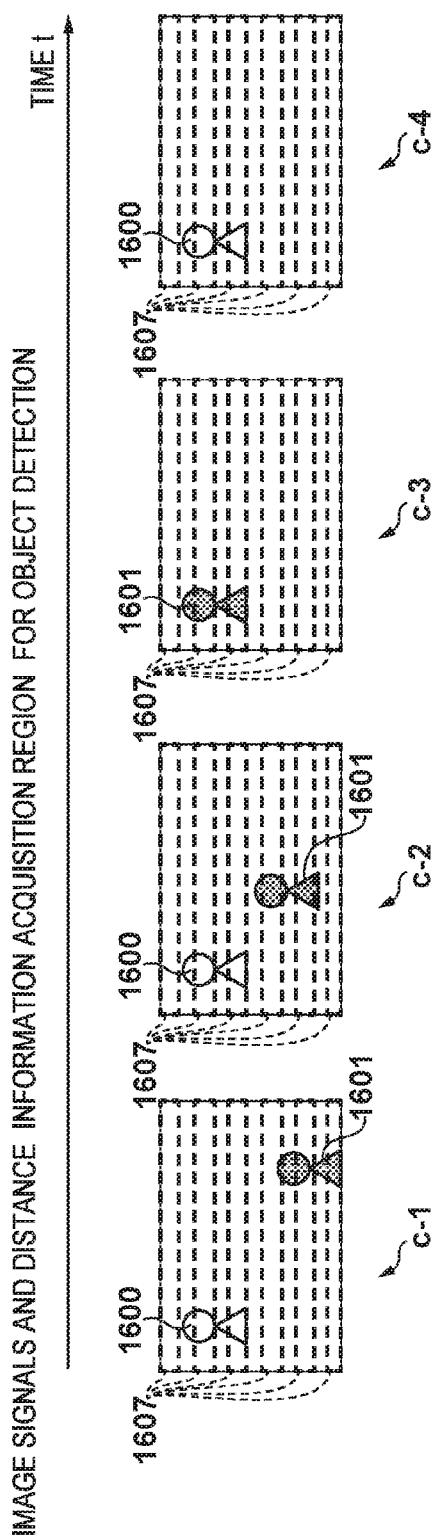

FIGS. 16A to 16C illustrate the relationship between a distance information acquisition region (for AF control) and a distance map thereof that are required for focus adjustment and distance information acquisition regions (for main object tracking) and a distance map thereof that are required for object detection, and those distance information acquisition regions and distance maps are suitably set on the imaging screen at the time of AF control during image shooting. Note that in FIGS. 16A to 16C, (a-1) to (a-4), (b-1) to (b-4), (c-1) to (c-4) and (d-1) to (d-4) indicate the frames of captured image signals in time series.

FIG. 16A illustrates image signals in the case where a distance information acquisition region for AF control is set on an imaging screen. In FIG. 16A, (a-1) indicates image signals and a distance information acquisition region for AF control at a certain time, reference numeral 1600 denotes a main object, reference numeral 1601 denotes an object other than the main object, and reference numeral 1602 denotes a distance information acquisition region. It suffices that distance information of the main object can be acquired for AF control, and thus it suffices for the distance information acquisition region that is set for AF control to encompass the main object. Therefore, the distance information acquisition region 1602 is locally set on the screen as in (a-1). In addition, as the time elapses as indicated by (a-1) to (a-4), the object 1601 other than the main object approaches the main object 1600 (a-2), the object 1601 other than the main object overlaps the main object 1600 (a-3), and then the object 1601 other than the main object disappears from the screen, and only the main object 1600 remains (a-4). In other words, the images (a-1) to (a-4) indicate a scene in which the main object and the other object pass each other.

FIG. 16B illustrates distance maps acquired from the distance information acquisition region 1602 in FIG. 16A. In FIG. 16B, (b-1) is a distance map acquired from the distance information acquisition region of (a-1), where a cross-hatched region 1603 indicates the distance of the main object 1600, and a solid white portion 1604 indicates the distance of the background. In addition, a solid black portion 1605 is a region outside of the distance information acquisition region, and thus distance information cannot be acquired. Moreover, a hatched portion 1606 of (b-3) indicates the distance of the object 1601 other than the main object in (a-3).

In the distance map in FIG. 16B, the distance information acquisition region for AF control is set for the main object 1600, and thus AF control accuracy does not deteriorate. On the other hand, in the case of detecting the main object 1600 using the distance map in FIG. 16B, only the distance 1603 of the main object 1600 can be acquired in (b-1) and (b-2), and it appears as if the distance of the main object 1600 changed suddenly in (b-3). In actuality, the object 1601 other than the main object overlapped the main object 1600 and thus the distance changed, but there is a possibility that correct determination cannot be performed.

FIG. 16C illustrates image signals in the case where distance information acquisition regions for object detection are set on the imaging screen. In FIG. 16C, (c-1) indicates image signals and distance information acquisition regions for object detection at a certain time. The state of the surroundings of the main object needs to be determined in order to detect the main object 1600 using distance information. Therefore, a distance information acquisition region needs to be set such that the entire screen can be viewed. Therefore, distance information acquisition regions 1607 are discretely set over the entire screen as in (c-1). Note that the state where time elapses as in (c-1) to (c-4) and the state where the object 1601 other than the main object overlaps the main object 1600 in (c-3) are similar to (a-3) in FIG. 16A.

Figure 16D:
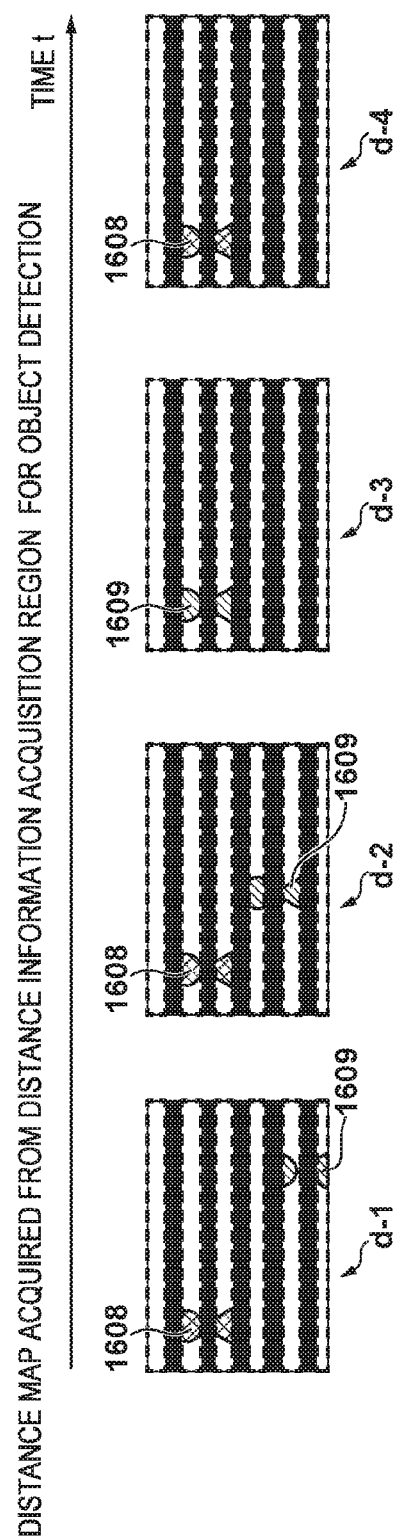

FIG. 16D illustrates a distance map acquired from the distance information acquisition regions 1607 in FIG. 16C. In FIG. 16D, the distance information acquisition regions 1607 are set such that the entire screen can be viewed, and thus it can be realized from the distance map that the object 1601 other than the main object approaches the main object 1600 as the time elapses from (d-1) to (d-2). In addition, in (d-3), the main object 1600 and the object 1601 other than the main object overlap each other, but since the object 1601 other than the main object approaches the main object 1600 from (d-1) to (d-2), and the object 1601 has a distance 1609 indicated by hatched lines, it can be determined that there is a high possibility that the main object 1600 and the object 1601 other than the main object overlap each other. On the other hand, a distance 1608 of the main object 1600 can only be acquired discretely, and thus accuracy of AF control deteriorates.

In this manner, the distance information acquisition region for AF control does not necessarily match the distance information acquisition regions for object detection (main object tracking), and thus if one of the regions is focused on, there is a possibility that accuracy for the other region deteriorates.

In view of this, in the following embodiments, both AF control accuracy and object detection accuracy can be ensured by variably controlling ratios for the distance information acquisition region for AF control and the distance information acquisition regions for object detection in units of frames or within a frame at the time of AF control during image shooting.

First Embodiment

In this embodiment, an example will be described in which an image capturing apparatus is realized by a digital video camera that has an autofocus (AF) function by a contrast detection method and a phase difference detection method, and also an object detection function (a main object tracking function), but the present invention can be applied to electronic devices such as smart phones, which are one type of a mobile phone, and tablet terminals.

Apparatus Configuration

The configuration of an image capturing apparatus 100 of this embodiment will be described below with reference to FIG. 1.

Figure 1:
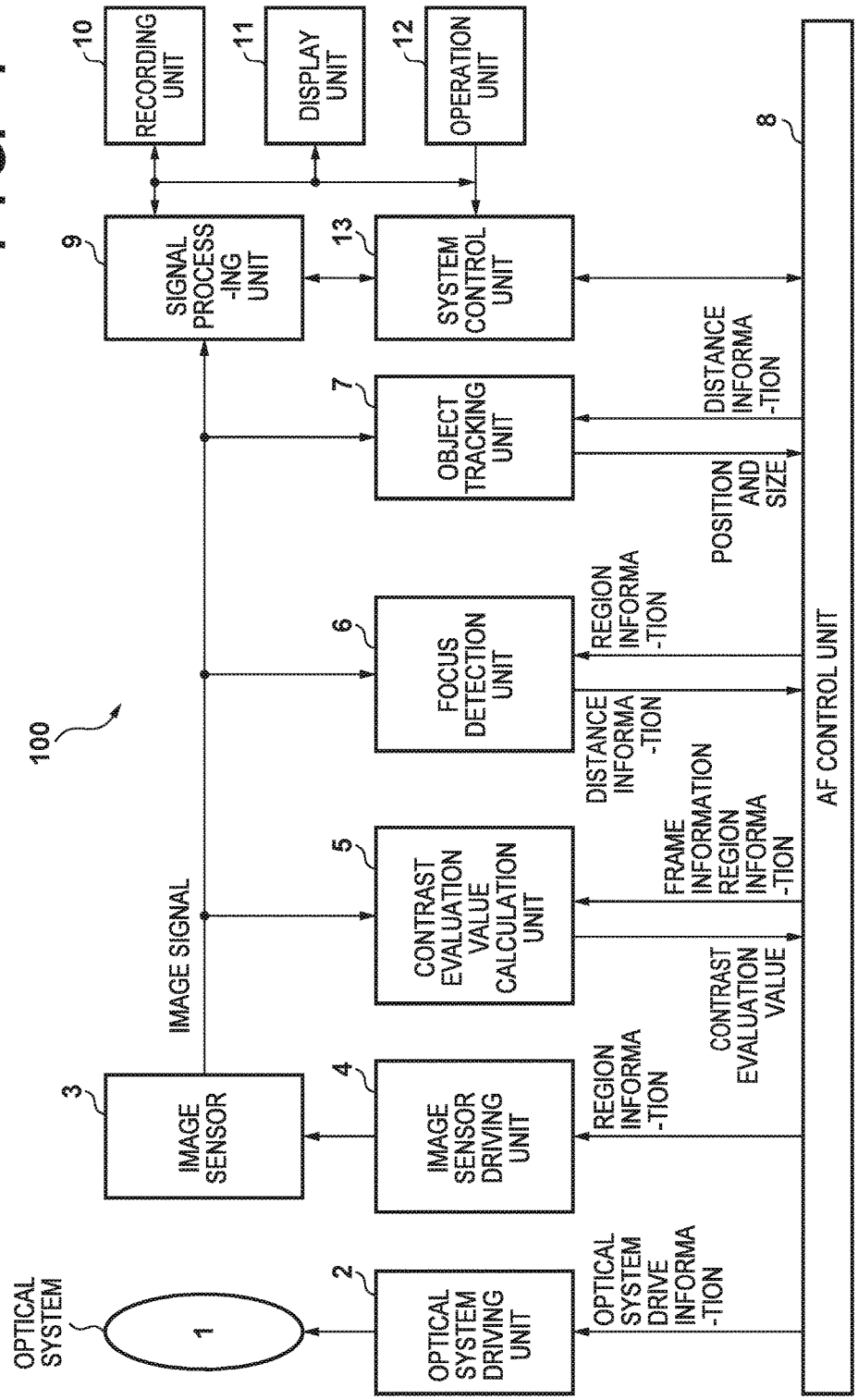
FIG. 1 is a block diagram showing the configuration of an image capturing apparatus of embodiments of the present invention.

In FIG. 1, an optical system 1 includes a zoom lens, a focus lens and a diaphragm. An optical system driving unit 2 controls the optical system 1 based on optical system drive information that is output from an AF control unit 8 to be described later. An image sensor 3 is provided with photoelectric conversion elements of a CMOS or the like, and converts an object image formed on a light receiving surface by the optical system 1 into electrical signals, and outputs image signals.

The image sensor driving unit 4 drives the image sensor 3 based on information regarding an object distance information acquisition region (hereinafter, region information) from the AF control unit 8 so as to control readout of the image signals. Note that the image sensor 3 of this embodiment has a plurality of pixel portions for receiving luminous beams that have passed through different pupil regions of the optical system 1, and outputting pupil-divided image signals. Also, the image signals (A image signals and B image signals) having different parallax (or viewpoints) can be individually read out from pupil-divided pixels by a drive pulse from the image sensor driving unit 4. The circuit configuration of the image sensor 3 will be described later with reference to FIG. 2 to FIG. 6C.

A contrast evaluation value calculation unit 5 calculates a contrast evaluation value (evaluation information) based on the image signals from the image sensor 3 and focus detection frame information from the AF control unit 8, and outputs the contrast evaluation value to the AF control unit 8.

A focus detection unit 6 calculates distance information for AF control (second depth information) and distance information for object detection within the screen (first depth information and distance map data) based on the image signals from the image sensor 3 and region information from the AF control unit 8, and outputs the distance information for AF control and the distance information for object detection to an object tracking unit 7 and the AF control unit 8.

The object tracking unit 7 detects objects in a captured image based on the image signals from the image sensor 3 and the distance information from the AF control unit 8, identifies a main object among the detected objects, and outputs, to the AF control unit 8, information regarding the position and the size of the main object (hereinafter, object information).

Under control of a system control unit 13, the AF control unit 8 outputs focus detection frame information and region information to the contrast evaluation value calculation unit 5, and outputs the region information to the focus detection unit 6. The AF control unit 8 also acquires a contrast evaluation value from the contrast evaluation value calculation unit 5 and distance information from the focus detection unit 6, and outputs a control signal to the optical system driving unit 2 and the image sensor driving unit 4.

A signal processing unit 9 generates image signals acquired by adding together image signals from the image sensor 3, performs predetermined signal processing, and outputs image signals for display or for recording. The signal processing unit 9 also performs image processing such as color conversion, white balance correction and gamma correction, resolution conversion processing, image compression conversion and the like on the generated image signals, and outputs, to a recording unit 10 and a display unit 11, image signals for display or for recording.

The recording unit 10 is a memory card, a hard disk or the like in which the image signals generated by the signal processing unit 9 are recorded, and from which images that have been already recorded are read out. The display unit 11 is a liquid crystal panel (LCD) or the like that displays images generated by the signal processing unit 9, various menu screens and the like. An operation unit 12 is constituted by various switches (e.g., AF on/off and zoom) for receiving a user operation, and transmits instructions from the user to the system control unit 13.

The system control unit 13 includes a CPU, a RAM and a ROM for integrally controlling various functions of the image capturing apparatus 100, a dedicated circuit and the like. The CPU executes a control sequence, which will be described later, by loading, to the RAM serving as a work memory, a program stored in the ROM that is a non-volatile memory, and executing the program.

Configuration of Image Sensor

Figure 2:
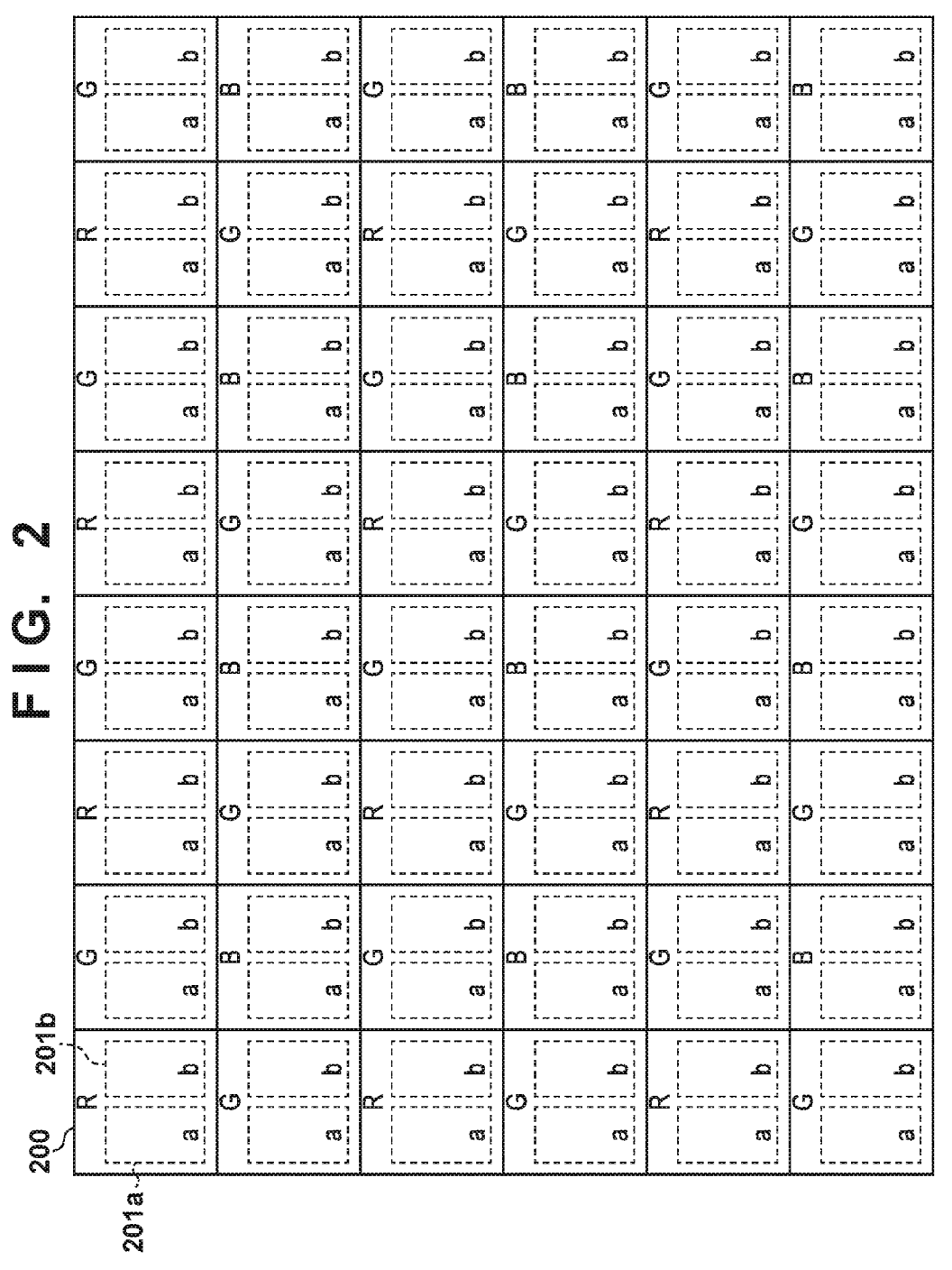

FIG. 2 is a schematic diagram showing the pixel arrangement of the image sensor 3. Unit pixels 200 are arranged in a matrix, and R (Red)/G (Green)/B (Blue) color filters are arranged on the unit pixels 200 in a Bayer pattern. In addition, subpixels a and b are arranged in each of the unit pixels 200, and photodiodes (hereinafter, PDs) 201a and 201b are respectively arranged in the subpixels a and b. Imaging signals that are output from the subpixels a and b are used for focus detection, and an a/b composite signal that is a signal acquired by adding the imaging signals output from the subpixel a and the subpixel b is used for image generation.

Figure 3:
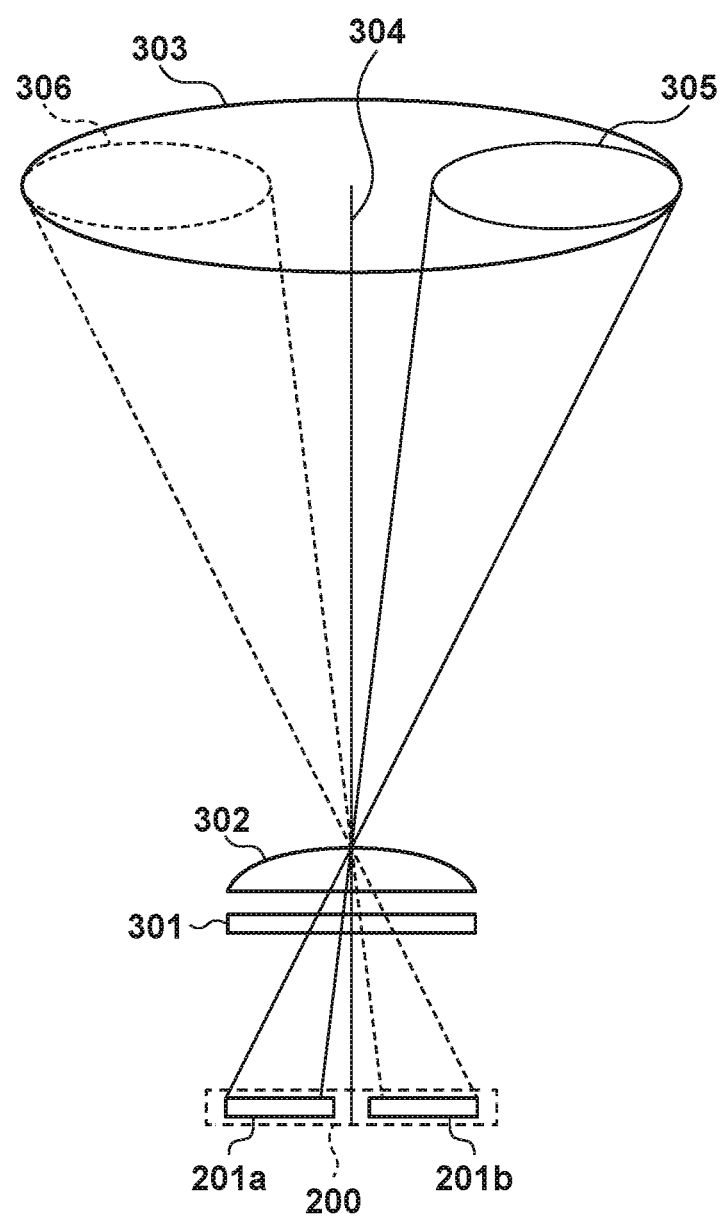
FIG. 3 is a diagram schematically showing the relationship between light beams coming from an exit pupil of a photographing lens and a pixel.

FIG. 3 shows the relationship between light beams coming from different regions of the exit pupil of the optical system 1 and the unit pixel 200, and the same reference numerals are assigned to constituent elements similar to those in FIG. 2.

As shown in FIG. 3, a color filter 301 and a microlens 302 are formed on each of the unit pixels 200. Specifically, the PDs 201a and 201b in the unit pixel 200 are assigned to one microlens 302. Light that has passed through an exit pupil 303 of the lens enters the unit pixel 200 centered on an optical axis 304. A light beam that passes through a pupil region 305, which is a region constituting a portion of the exit pupil 303, passes through the microlens 302, and is received by the subpixel a. On the other hand, a light beam that passes through a pupil region 306, which is a region constituting another portion of the exit pupil 303, passes through the microlens 302, and is received by the subpixel b. Therefore, the subpixels a and b respectively receive light from the separate pupil regions 305 and 306 of the exit pupil 303 of the optical system 1. Therefore, phase difference (imaging plane) focus detection is made possible by comparing an output signal of the subpixel a (A image signal) with an output signal of the subpixel b (B image signal) that have different parallax (or viewpoints) as described above.

Figure 4:
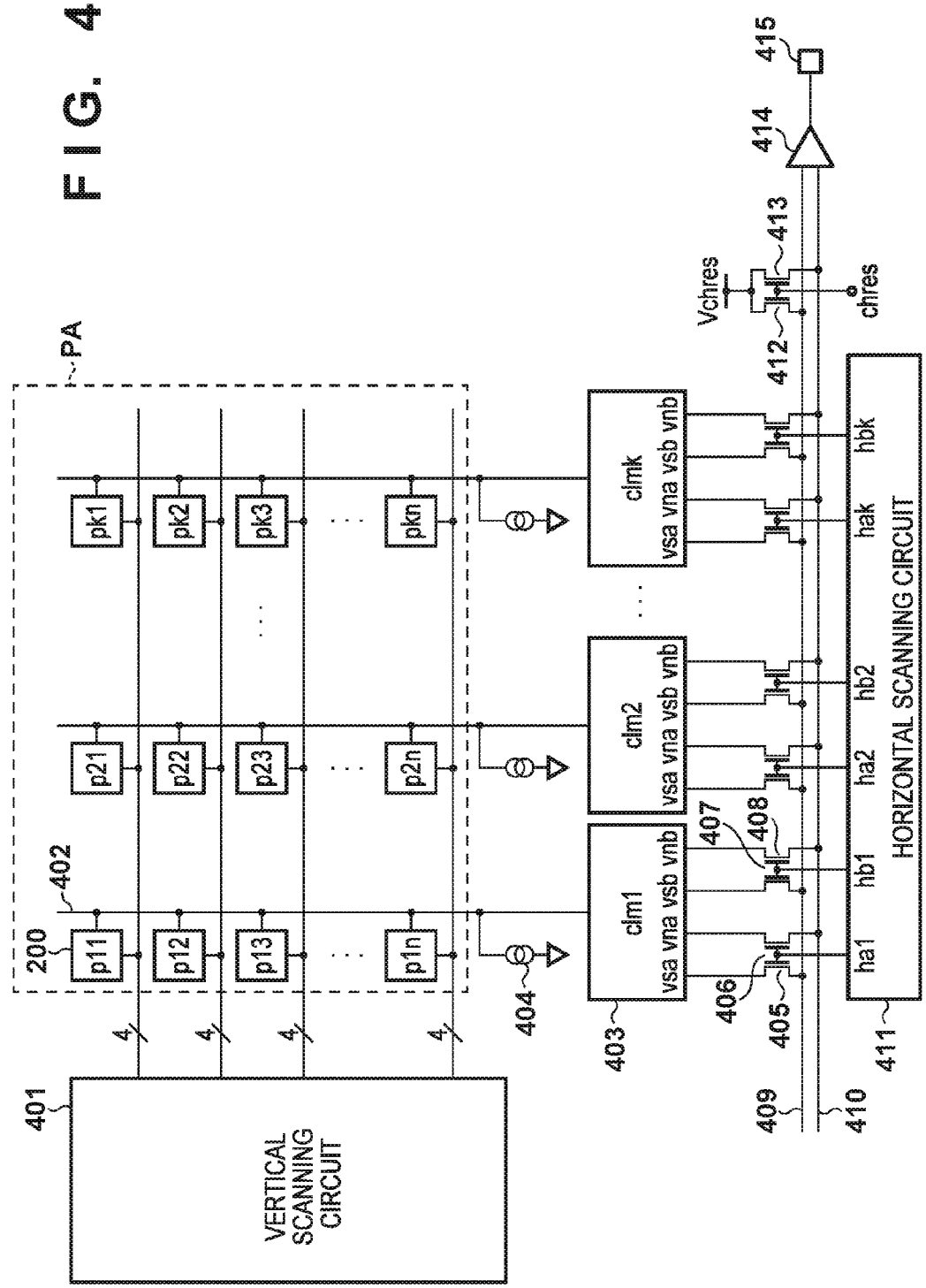
FIG. 4 is a configuration diagram of the image sensor of the embodiments.
Figure 5A:
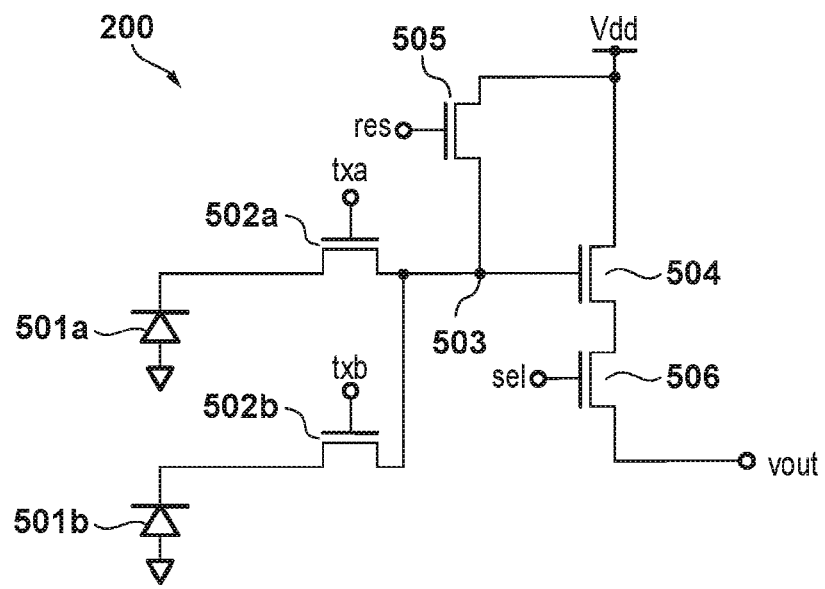
FIG. 5A is a diagram showing the circuit configuration of a unit pixel of the image sensor of the embodiments.

FIG. 4 shows the circuit configuration of the image sensor 3. In a pixel region PA, the unit pixels 200 are arranged in a matrix (n rows×k columns) as indicated by p11 to pkn. Here, the configuration of the unit pixel 200 will be described with reference to FIG. 5A. FIG. 5A is a diagram showing the circuit configuration of a unit pixel of the image sensor.

In FIG. 5A, optical signals that have entered PDs (photoelectric conversion portion) 501a and 501b of the above-described subpixels a and b undergo photoelectric conversion performed by the PDs 501a and 501b, and electric charges that correspond to an exposure amount are accumulated in the PDs 501a and 501b. The electric charges accumulated in the PDs 501a and 501b are transferred to an FD (floating diffusion) portion 503 (electric charge transfer) by raising signals txa and txb that are respectively applied to the gates of transfer gates 502a and 502b to the high level. The FD portion 503 is connected to the gate of a floating diffusion amplifier 504 (hereinafter, expressed as an FD amplifier), and the amount of electric charges transferred from the PDs 501a and 501b is converted into a voltage amount by the FD amplifier 504.

The FD portion 503 is reset by raising, to the high level, a signal res that is applied to the gate of an FD reset switch 505 for resetting the FD portion 503. In addition, in the case of resetting the electric charges of the PDs 501a and 501b, the signal res as well as the signals txa and txb are raised to the high level at the same time. This turns on both the transfer gates 502a and 502b and the FD reset switch 505, and the PDs 501a and 501b are reset via the FD portion 503. A pixel signal that has been converted into a voltage by the FD amplifier 504 is output to an output vout of the unit pixel 200 by raising a signal sel that is applied to the gate of a pixel selection switch 506 to the high level.

As shown in FIG. 4, a vertical scanning circuit 401 supplies, to each of the unit pixels 200, driving signals such as res, txa, txb and sel for controlling the above-described switches of the unit pixel 200. These driving signals res, txa, txb and sel are common to each row. The outputs vout of the unit pixels 200 are connected to a column common readout circuit 403 via a vertical output line 402 for each column.

Here, the configuration of the column common readout circuit 403 will be described with reference to FIG. 5B.

The vertical output line 402 is provided for each column of unit pixels 200, and is connected to the outputs vout of the unit pixels 200 for one column. A current source 404 is connected to the vertical output line 402, and a source follower circuit is constituted by the current source 404 and the FD amplifiers 504 of the unit pixels 200 connected to the vertical output line 402.

Figure 5B:
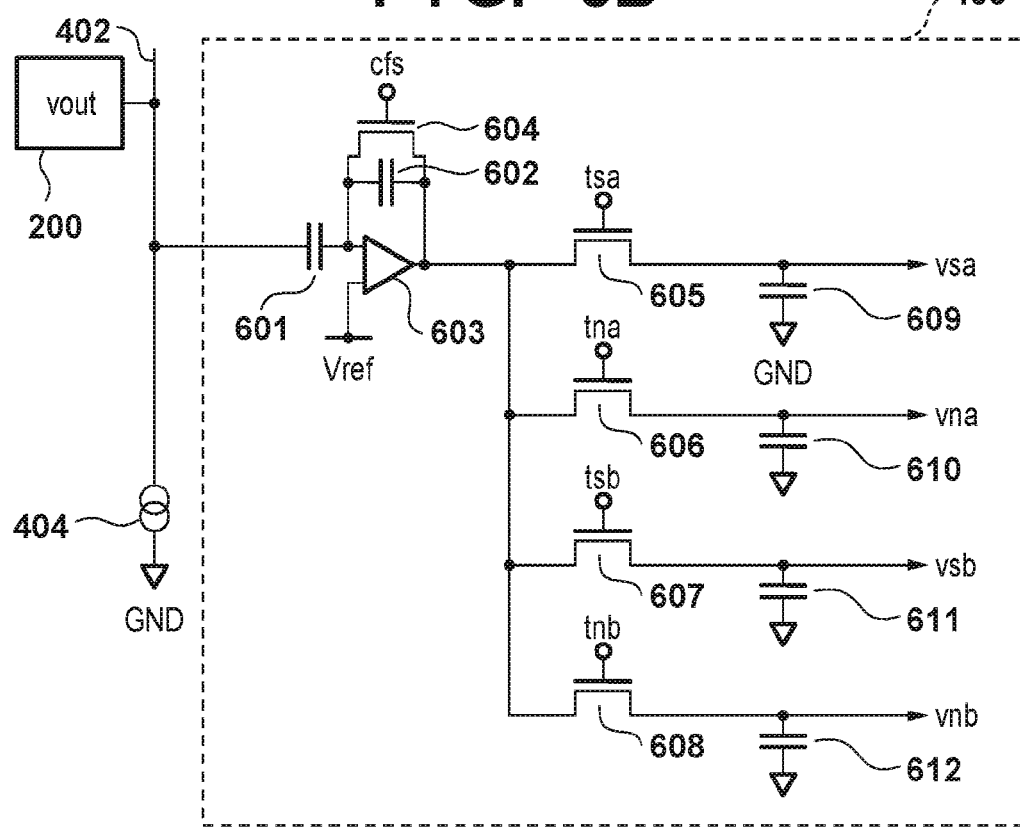
FIG. 5B is a configuration diagram of a readout circuit for a column of unit pixels of the image sensor of the embodiments.

In FIG. 5B, a clamp capacitor 601 has a capacity of C1, a feedback capacitor 602 has a capacity of C2, and an operational amplifier 603 has a non-inverted input terminal connected to a reference power supply Vref. A switch 604 is used for causing two ends of the feedback capacitor 602 to short-circuit, and the switch 604 is controlled by a signal cfs.

Transfer switches 605 to 608 are used for respectively transferring, to signal storage capacitors 609 to 612, signals read out from the unit pixels 200. The first S signal storage capacitor 609 stores a pixel signal Sa that is output from the subpixel a by a readout operation to be described later. Also, the second S signal storage capacitor 611 stores an a/b composite signal Sab that is a signal acquired by compositing (adding) a signal output from the subpixel a and a signal output from the subpixel b. Moreover, the first N signal storage capacitor 610 and the second N signal storage capacitor 612 respectively store noise signals N of the unit pixels 200. The signal storage capacitors 609 to 612 are respectively connected to outputs vsa, vna, vsb and vnb of the column common readout circuit 403.

Horizontal transfer switches 405 and 406 are respectively connected to the outputs vsa and vna of the column common readout circuit 403. The horizontal transfer switches 405 and 406 are controlled by an output signal ha* (* is a column number) of a horizontal scanning circuit 411.

Also, horizontal transfer switches 407 and 408 are respectively connected to the outputs vsb and vnb of the column common readout circuit 403. The horizontal transfer switches 407 and 408 are controlled by an output signal hb* (* is a column number) of the horizontal scanning circuit 411. Horizontal output lines 409 and 410 are connected to an input of a differential amplifier 414, and the differential amplifier 414 takes the difference between an S signal and an N signal, applies a predetermined gain at the same time, and outputs a final output signal to an output terminal 415.

When a signal chres applied to the gates of horizontal output line reset switches 412 and 413 is raised to the high level, the horizontal output line reset switches 412 and 413 are turned on, and the horizontal output lines 409 and 410 are reset to a reset voltage Vchres.

An operation of reading out A image signals and an operation of reading out A+B image signals that are composite signals of the A image signals and B image signals will be described below.

FIG. 5C shows the relationship between distance information acquisition regions for focus adjustment and distance information acquisition regions for object detection that are set in the pixel region PA of the image sensor 3. Focus detection frames 620 are set by the focus detection unit 6, using region information from the AF control unit 8.

In the pixel region PA constituted by pixels of k columns×n rows, regions indicated by dotted lines are the focus detection frames 620. A image signals and A+B image signals are read out from unit pixel rows (pixel lines) included in distance information acquisition regions R1 indicated by hatched portions, and are used for image generation, focus detection and object detection. Only addition signals of A image signals and B image signals are read out from unit pixel rows (pixel lines) included in regions R2 other than the distance information acquisition regions R1, and are used only for image generation.

Note that as shown in FIG. 5C, if a plurality of regions R1 are set in the vertical direction of the pixel region, the number of rows of the unit pixels 200 may be set differently in each of the regions R1.

Figure 6A:
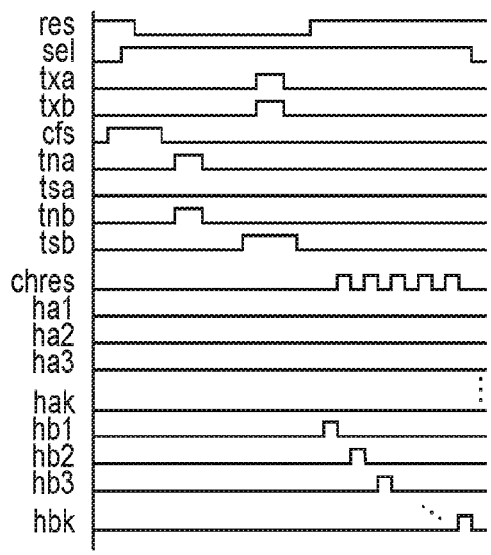
FIGS. 6A to 6C are timing charts of an operation of reading out a row of unit pixels of the image sensor of the embodiments.

Next, a readout operation of the image sensor 3 will be described with reference to FIG. 6A. FIG. 6A is a timing chart of the above-described readout operation performed on each row of the above-described regions R2.

First, the operational amplifier 603 is brought into a buffer state by raising the signal cfs to the high level and turning on the switch 604. Next, the signal sel is raised to the high level, and the pixel selection switch 506 of a unit pixel is turned on. After that, the signal res is lowered to the low level, and the FD reset switch 505 is turned off so as to release the resetting of the FD portion 503.

Subsequently, after the signal cfs is returned to the low level and the switch 604 is turned off, signals tna and tnb are raised to the high level, and noise signals N are stored in the first N signal storage capacitor 610 and the second N signal storage capacitor 612 via transfer switches 606 and 608.

Next, the signals tna and tnb are lowered to the low level, and the transfer switches 606 and 608 are turned off. After that, a transfer switch 607 is turned on by raising a signal tsb to the high level, and the transfer gates 502*a* and 502*b* are turned on by raising the signals txa and txb to the high level. By this operation, signals acquired by compositing electric charge signals accumulated in the PDs 501*a* of the subpixels a and electric charge signals accumulated in the PDs 501*b* of the subpixels b are output to the vertical output line 402 via the FD amplifier 504 and the pixel selection switch 506. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the second S signal storage capacitor 611 via the transfer switch 607 (the a/b composite signal Sab). After sequentially turning off the transfer gates 502*a* and 502*b* and the transfer switch 607, the signal res is raised to the high level so as to turn on the FD reset switch 505, and the FD portion 503 is reset.

Next, the horizontal transfer switches 407 and 408 are turned on due to an output hb1 of the horizontal scanning circuit 411 rising to the high level. Accordingly, signals of the second S signal storage capacitor 611 and the second N signal storage capacitor 612 are output to the output terminal 415 via the horizontal output lines 409 and 410 and the differential amplifier 414. The horizontal scanning circuit 411 outputs the a/b composite signals (the A+B image signals) for one row by sequentially raising selection signals hb1, hb2, . . . , hbk of each column to the high level. Note that while signals of each column are read out by the signals hb1 to hbk, the horizontal output line reset switches 412 and 413 are turned on by raising the signal chres to the high level, and the horizontal output lines 409 and 410 are reset to the level of the reset voltage Vchres once.

The above-described operation is an operation of reading out each row of unit pixels in the region R2. The A+B image signals are read out by this operation.

Figure 6B:
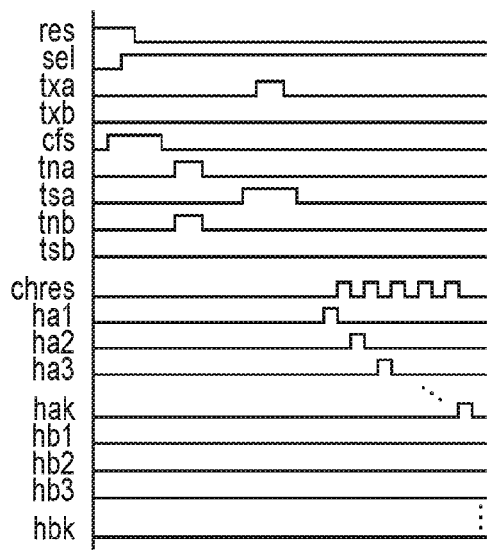
Figure 6C:
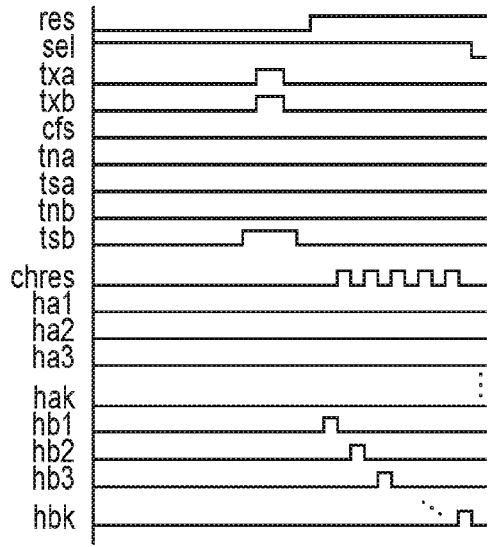

Subsequently, an operation of reading out each row of the regions R1 will be described with reference to FIGS. 6B and 6C. FIG. 6B is a timing chart of an operations for readout of the A image signals. The operation of first raising the signal cfs to the high level, lowering the signals tna and tnb to the low level, and storing N signals in the first N signal storage capacitor 610 and the second N signal storage capacitor 612 is similar to the operation described with reference to FIG. 6A.

When storing of the noise signals N ends, the transfer switch 605 is turned on by raising a signal tsa to the high level, and the transfer gate 502*a* is turned on by raising the signal txa to the high level. Signals accumulated in the PDs 501*a* of the subpixels a are output to the vertical output line 402 via the FD amplifier 504 and the pixel selection switch 506 by performing such an operation. Signals of the vertical output line 402 are amplified by the operational amplifier 603 using a gain that corresponds to the capacity ratio of the capacity C1 of the clamp capacitor 601 to the capacity C2 of the feedback capacitor 602, and are stored in the first S signal storage capacitor 609 via the transfer switch 605 (the pixel signal Sa).

Next, the horizontal transfer switches 405 and 406 are turned on due to an output ha1 of the horizontal scanning circuit 411 rising to the high level. Accordingly, signals of the first S signal storage capacitor 609 and the first N signal storage capacitor 610 are output to the output terminal 415 via the horizontal output lines 409 and 410 and the differential amplifier 414. The horizontal scanning circuit 411 outputs the signals of the subpixels a (the A image signals) for one row by sequentially raising selection signals ha1, ha2, . . . , hak for each column to the high level.

Readout of the A image signals ends while the signal res remains at the low level, and the signal sel remains at the high level. Accordingly, the A image signals on the FD portions 503 are held without being reset.

When readout of the A image signals ends, the procedure subsequently transitions to an operation of reading out the A+B image signals shown in FIG. 6C. The transfer switch 607 is turned on by raising the signal tsb to the high level, and the transfer gates 502*a* and 502*b* are turned on by raising the signals txa and txb to the high level. Due to such an operation, signals accumulated in the PDs 501*b* of the subpixels b are added to the signals of the subpixels a stored in the FD portion 503, and the added signals are output to the vertical output line 402 via the FD amplifier 504 and the pixel selection switch 506. The rest of the operation is the same as the operation regarding the region R2 described with reference to FIG. 6A.

In such a manner, an operation of reading out each row in the regions R1 ends. Accordingly, in the region R1, readout of the A image signals and readout of the A+B image signals are performed, and the A image signals and the A+B image signals are sequentially read out.

Shooting Operation

Next, an operation during image shooting performed by the image capturing apparatus 100 that has the above-described configuration will be described.

First, the optical system 1 uses a driving signal from the optical system driving unit 2 to drive the diaphragm and the lens, so as to form an object image whose brightness is set to be appropriate, on the light receiving surface of the image sensor 3. The image sensor 3 is driven by a drive pulse from the signal readout control unit 4, converts the object image into electrical signals by photoelectric conversion, and outputs the electrical signals as image signals.

Using a drive pulse that corresponds to region information from the AF control unit 8, the image sensor driving unit 4 reads out the A image signals and reads out the A+B image signals from the region R1, and reads out the A+B image signals from the region R2 by the above-described readout operation. The processing load is reduced by reading out the A image signals from a portion of the region in this manner. Furthermore, in the region R1 from which the A image signals have been read out, the AF control unit 8 acquires B image signals by subtracting the A image signals from the A+B image signals, and performs AF control using the A image signals and the B image signals. Note that AF control may be performed by individually reading out the A image signals and the B image signals from the region R1, and reading out the A+B image signals from the region R2 other than the region R1.

The contrast evaluation value calculation unit 5 calculates a contrast evaluation value in a focus detection frame based on image signals from the image sensor 3 and focus detection frame information from the AF control unit 8, and outputs the contrast evaluation value to the AF control unit 8. In this case, the contrast evaluation value calculation unit 5 adds the A image signals and the B image signals based on region information from the AF control unit 8, applies the same format as the A+B image signals read out from regions R2 other than the distance information acquisition regions R1, and calculates the contrast evaluation value.

Here, an overview of contrast AF will be described. The contrast evaluation value calculation unit 5 shifts a first focus detection signal acquired from the A image signal and a second focus detection signal acquired from the B image signal relatively in the pupil division direction, adds those signals to generate a shift addition signal, and calculates a contrast evaluation value from the generated shift addition signal.

Letting a k-th first focus detection signal be A(k), a k-th second focus detection signal be B(k), the range of the number k for the distance information acquisition region R1 be W, the shift amount due to shift processing be s1, and the shift range of the shift amount s1 be τ1, a contrast evaluation value RFCON is calculated using the following expression.

$$RFCON(s1) = \max_{k \in W} |A(k) - B(k - s1)|, s1 \in \tau1$$

Due to shift processing by the shift amount s, the k-th first focus detection signal A (k) and a (k−s1)th second focus detection signal B (k−s1) are added in association with each other so as to generate a shift addition signal, and the contrast evaluation value RFCON (s1) is calculated from the shift addition signal.

The focus detection unit 6 calculates distance information of the object (first depth information and second depth information) based on region information from the AF control unit 8, using the A image signals read out from a distance information acquisition region for AF and a distance information acquisition region for object detection that are variably controlled by the image sensor driving unit 4, and the B image signal acquired by subtracting the A image signal from the A+B image signal. Note that in this embodiment, distance information is phase difference information (defocus amount) for performing phase difference (imaging plane) AF.

Here, an overview of phase difference AF will be described. The focus detection unit 6 shifts a first focus detection signal acquired from the A image signal and a second focus detection signal acquired from the B image signal relatively in the pupil division direction, and calculates a correlation amount indicating a signal matching degree. Letting a k-th first focus detection signal be A(k), a k-th second focus detection signal be B(k), the range of the number k for the distance information acquisition region R1 be W, the shift amount due to shift processing be s2, and the shift range of the shift amount s2 be τ2, a correlation amount COR is calculated using the following expression.

$$COR(s2) = \sum_{k \in W} |A(k) - B(k - s2)|, s2 \in \tau2$$

Due to shift processing by the shift amount s2, the k-th first focus detection signal A (k) and a (k−s2)th second focus detection signal B (k−s2) are associated with each other, and subtraction is performed to generate a shift subtraction signal, and the sum of the k signals is obtained within the range W corresponding to the distance information acquisition region so as to calculate the correlation amount COR (s2). After that, the shift amount of a real value at which the correlation amount is a minimum value is calculated from the correlation amount by performing subpixel calculation, and is denoted by an image shift amount p1. The image shift amount p1 is multiplied by the image height of the focus detection region, the F-number of the imaging lens (imaging optical system) and a first conversion coefficient K1 that corresponds to the exit pupil distance so as to detect the defocus amount.

Note that in this embodiment, an example is described in which the focus detection unit 6 calculates distance information from A image signals and B image signals having different parallax (or viewpoints), but "information corresponding to depth" that is not converted into "distance" may be used as information for object detection, for example. The "information corresponding to depth" may be in any form of information regarding a "parallax amount (an image shift amount)" of A image signals and B image signals generated in the process of conversion into "distance", information regarding a "defocus amount", and information regarding "object distance", for example. In addition, in this embodiment, the "object distance" among the "information corresponding to depth" is acquired in a state of being dispersed over the entire screen, as information for object detection. Note that the "information corresponding to depth" for object detection may be recorded in association with the image.

The present invention can be applied to various embodiments as information corresponding to the depths of the objects in an image. Accordingly, it suffices for information (depth information) indicated by data corresponding to the depths of the objects to be information directly indicating the object distances in the image from the image capturing apparatus to the object or information indicating the relative relationship between the object distances and the depths of the object in the image.

Specifically, the image sensor 3 can output images formed as optical images by a pair of light beams that pass through different pupil regions of the optical system 1, as paired image signals, from a plurality of photoelectric conversion portions. An image shift amount of each region is calculated by correlation calculation between the paired image signals, and an image shift map indicating the distribution of the image shift amounts is calculated. Alternately, the image shift amount is further converted into a defocus amount, and a defocus map indicating defocus amount distribution (distribution on the two dimensional planes of the captured image) is generated. If this defocus amount is converted into an object distance based on the conditions of the optical system 1 or the image sensor 3, distance map data that indicates an object distance distribution is acquired.

As described above, in this embodiment, it suffices for the focus detection unit 6 to acquire image shift map data, defocus map data, or distance map data of object distances converted from a defocus amount. Note that data of each map data may be held in units of blocks, or in units of pixels. In this case, about eight bits as the number of bits are assigned in the smallest unit as in normal image data, and image processing, displaying, recording and the like may be performed using the data as distance image, similarly to image processing.

The object tracking unit 7 detects objects based on image signals from the image sensor 3 and distance information from the AF control unit 8, specifies a main object from the detected objects, and outputs object information regarding the position and the size of the main object to the AF control unit 8. If the object tracking unit 7 tracks the face of a specific person as the main object (main face), a face at a position closer to the center of the screen is set as the main face, and the destination of the main face is detected from the movement vector, color and size of the main face. The object tracking unit 7 then tracks the main face based on distance information of the main face and distance information of an object around the main face, and determines the main face in cases such as where another object and the main face pass each other.

The AF control unit 8 outputs region information to the image sensor driving unit 4 based on the contrast evaluation value from a contrast evaluation value calculation unit 5 and distance information from the focus detection unit 6.

In addition, in the case of performing contrast AF, the AF control unit 8 detects an in-focus position (a peak position at which the contrast evaluation value is largest) based on a contrast evaluation value from the contrast evaluation value calculation unit 5, and outputs, to the optical system driving unit 2, optical system driving information for bringing the main object into the in-focus state. Also, in the case of performing phase difference AF, the AF control unit 8 detects an in-focus position based on distance information (corresponding to an image shift amount or a defocus amount at which the correlation amount is smallest) from the focus detection unit 6, and outputs, to the optical system driving unit 2, optical system driving information for bringing the main object into the in-focus state. Note that the AF control unit 8 may perform control so as to bring the main object closer to the in-focus state (using distance information from the focus detection unit 6) by performing phase difference AF, and to bring the main object into the in-focus state (using contrast evaluation value) by further performing contrast AF. In other words, the AF control unit 8 may perform control so as to bring the main object into the in-focus state using at least one of the contrast evaluation value from the contrast evaluation value calculation unit 5 and the distance information from the focus detection unit 6.

The signal processing unit 9 generates image data by converting image signals from the image sensor 3 into luminance signals and color difference signals, and outputs the image data to the recording unit 10 and the display unit 11. The recording unit 10 and the display unit 11 record and display the image data generated by the signal processing unit 9.

Processing for Calculating Optical System Driving Information and Region Information in AF Control Unit 8

Next, processing for calculating optical system driving information and region information performed by the AF control unit 8 will be described with reference to FIG. 7.

First, processing for calculating optical system driving information to be output to the optical system driving unit 2 performed by the AF control unit 8 will be described.

Figure 7:
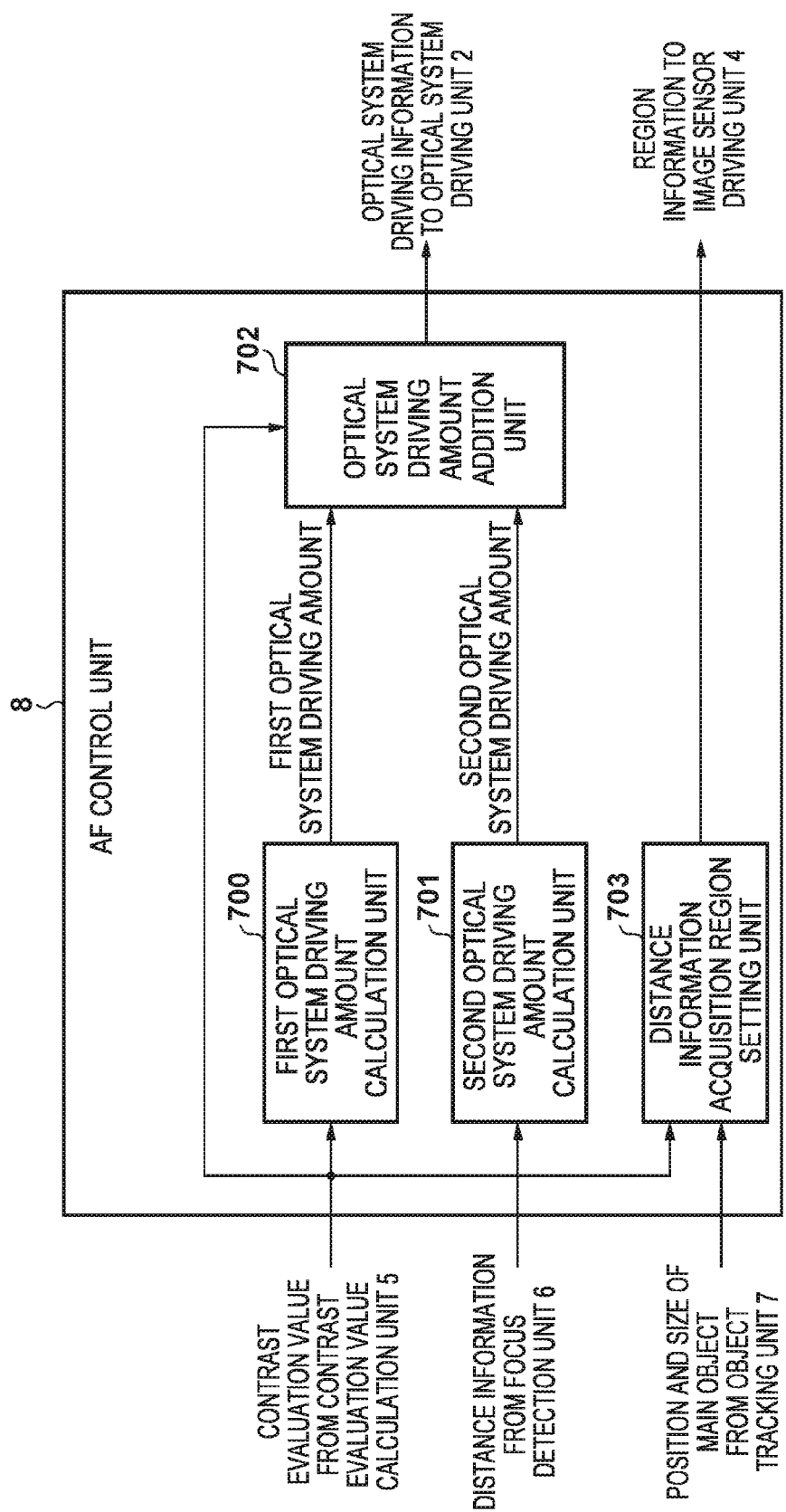
FIG. 7 is a block diagram showing the configuration of an AF control unit of a first embodiment.

In FIG. 7, a first optical system driving amount calculation unit 700 calculates a first optical system driving amount based on a contrast evaluation value from the contrast evaluation value calculation unit 5, by a so-called mountain climbing method. A second optical system driving amount calculation unit 701 calculates a second optical system driving amount based on distance information from the focus detection unit 6. An optical system driving amount addition unit 702 weights and adds the first and second optical system driving amounts based on a contrast evaluation value to be described later, and calculates optical system driving information to be output to the optical system driving unit 2.

As described above, contrast AF uses a so-called mountain climbing method, and it takes time to calculate a lens driving amount so as to increase the contrast evaluation value while moving the focus lens, and bring an object into an in-focus state. On the other hand, phase difference AF makes it possible to calculate a very accurate lens driving amount even in the case of heavy blur, since distance information to the object can be acquired. Therefore, the lens can be driven to close to a focus position quickly, but focus adjustment accuracy near the focus position is lower compared to contrast AF.

Figure 8:
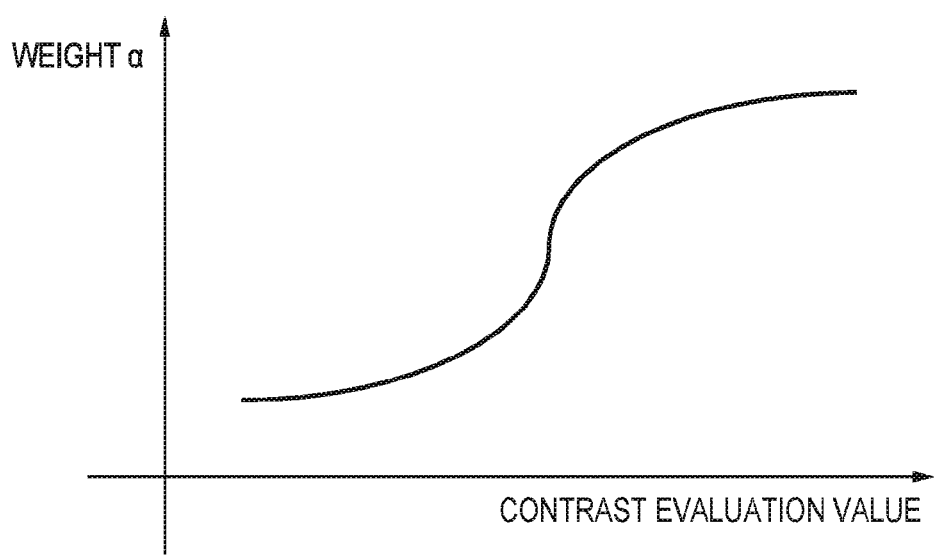
FIG. 8 is a diagram illustrating a weight coefficient when calculating optical system driving information of the first embodiment.

In view of this, in this embodiment, as shown in FIG. 8, the optical system driving unit 2 weights the first optical system driving amount and the second optical system driving amount according to the contrast evaluation value.

Specifically, a coefficient α is set such that the larger the contrast evaluation value is, the larger the weight of the first optical system driving amount becomes, and the smaller the contrast evaluation value is, the smaller the weight of the second optical system driving amount becomes, and addition is performed using the following expression, for example.

$$MV = \alpha \times Caf + (1-\alpha) \times R^* Daf$$

Here, α is the weight coefficient, Caf is the first optical system driving amount, and Daf is the second optical system driving amount.

Next, processing for calculating region information to be output to the image sensor driving unit 4 performed by the AF control unit 8 will be described.

A distance information acquisition region setting unit 703 in FIG. 7 sets region information based on a contrast evaluation value that is from the contrast evaluation value calculation unit 5 and object information (position and size) of a main object that is from the object tracking unit 7.

Operation of AF Control Unit

Next, processing for outputting region information to the image sensor driving unit 4 at the time of AF control during a shooting operation, performed by the distance information acquisition region setting unit 703 of the AF control unit 8, will be described with reference to FIG. 9.

In step S900, the distance information acquisition region setting unit (hereinafter, region setting unit) 703 acquires a contrast evaluation value from the contrast evaluation value calculation unit 5.

In step S901, the region setting unit 703 acquires object information (position and size) of a main object from the object tracking unit 7.

In step S902, the region setting unit 703 determines the AF state based on the contrast evaluation value acquired in step S901. The region setting unit 703 uses thresholds Th1 and Th2 (Th1<Th2) to determine that the AF state is a heavily blurred state if the contrast evaluation value is smaller than the threshold Th1, determine that the AF state is a moderately blurred state if the contrast evaluation value is greater than the threshold Th1 and smaller than the threshold Th2, and determine that the AF state is an in-focus state if the contrast evaluation value is greater than the threshold Th2. The procedure then advances to step S903 if it is determined that the AF state is the heavily blurred state, the procedure advances to step S904 if it is determined that the AF state is the moderately blurred state, and the procedure advances to step S905 if it is determined that the AF state is the in-focus state.

Here, as described above, the weight coefficient α is set such that the larger the contrast evaluation value is, the greater the weight of the first optical system driving amount becomes, and the smaller the contrast evaluation value is, the smaller the weight of the second optical system driving amount becomes. Therefore, when the contrast evaluation value is large, deterioration in AF control accuracy is small even if the accuracy in calculation of the second optical system driving amount is reduced. In opposite terms, if the contrast evaluation value is small, accuracy in calculation of the second optical system driving amount must not be reduced.

Moreover, in the object tracking unit 7, a distance map for object detection is not necessary if the contrast evaluation value is too small to determine a main object, and is necessary if the contrast evaluation value is large enough to identify the main object. In view of this, in this embodiment, the frequency of frames in which a distance information acquisition region for AF control is set and the frequency of frames in which distance information acquisition regions for object detection are set are variably controlled according to the contrast evaluation value, thus making it possible to acquire a distance map that can ensure both AF control accuracy and object tracking accuracy.

Here, control performed so as to switch the frequency at which a distance information acquisition region is set in steps S903 to S905 in FIG. 9 will be described in detail with reference to FIGS. 10A to 10C. Note that in FIGS. 10A to 10C, (a-1) to (a-4), (b-1) to (b-4) and (c-1) to (c-4) respectively indicate frames of captured image signals in time series. In addition, in FIGS. 10A to 10C, reference numeral 1000 denotes a main object, reference numeral 1001 denotes an object other than the main object, and reference numeral 1002 denotes a distance information acquisition region for AF control. Also, reference numeral 1003 denotes a distance information acquisition region for object detection. Moreover, FIG. 10A illustrates an example of region setting in a heavily blurred state (step S903), FIG. 10B illustrates an example of region setting in a moderately blurred state (step S904), and FIG. 10C illustrates an example of region setting in an in-focus state (step S905).

In the case of the heavily blurred state in step S903, the region setting unit 703 performs region setting such that the frequency of frames in which the distance information acquisition region for AF control 1002 is set is a maximum as in FIG. 10A.

In the case of the moderately blurred state in step S904, the region setting unit 703 performs region setting such that the frequency of frames in which the distance information acquisition region for AF control 1002 is set is moderate as in FIG. 10B. In the moderately blurred state in FIG. 10B, the frequency of frames in which the distance information acquisition region for AF control 1002 is set lower than in the heavily blurred state in FIG. 10A, and the frequency of frames in which distance information acquisition regions for object detection are set is higher.

The AF state in step S905 is the in-focus state, and thus the region setting unit 703 performs region setting so as to reduce the frequency of frames in which a distance information acquisition region for AF control is set as in FIG. 10C. In the in-focus state in FIG. 10C, the frequency of frames in which the distance information acquisition region for AF control 1002 is set is further reduced compared to the moderately blurred state in FIG. 10B, and the frequency of frames in which distance information acquisition regions for object detection are set is increased. For example, the ratio of frames in which the distance information acquisition region for AF control 1002 is set and the ratio of frames in which the distance information acquisition regions for object detection are set are the same as in FIG. 10C.

In step S906, the region setting unit 703 calculates region information according to the setting frequency of a distance information acquisition region for AF control set in steps S903 to S905, and outputs the region information to the image sensor driving unit 4.

In step S907, the region setting unit 703 determines whether or not the shooting operation has ended, using, as a trigger, an instruction to end the shooting from the user via the operation unit 12 or the like, and repeats the processing from step S900 until it is determined that the operation has ended.

According to this embodiment, the ratio of frames in which a distance information acquisition region for AF control is set and the ratio of frames in which distance information acquisition regions for object detection are set are variably controlled according to the contrast evaluation value at the time of AF control during image shooting. This makes it possible to ensure both AF control accuracy and main object tracking accuracy.

Note that in the above embodiment, a distance information acquisition region for AF control is set based on object information (position and size) of a main object, but the region may be set according to an AF mode or an object designated by the user. Moreover, the AF state is determined based on the contrast evaluation value, but the AF state may be determined by the focus detection unit 6 by a phase difference method.

Second Embodiment

Next, a second embodiment will be described.

Figure 11:
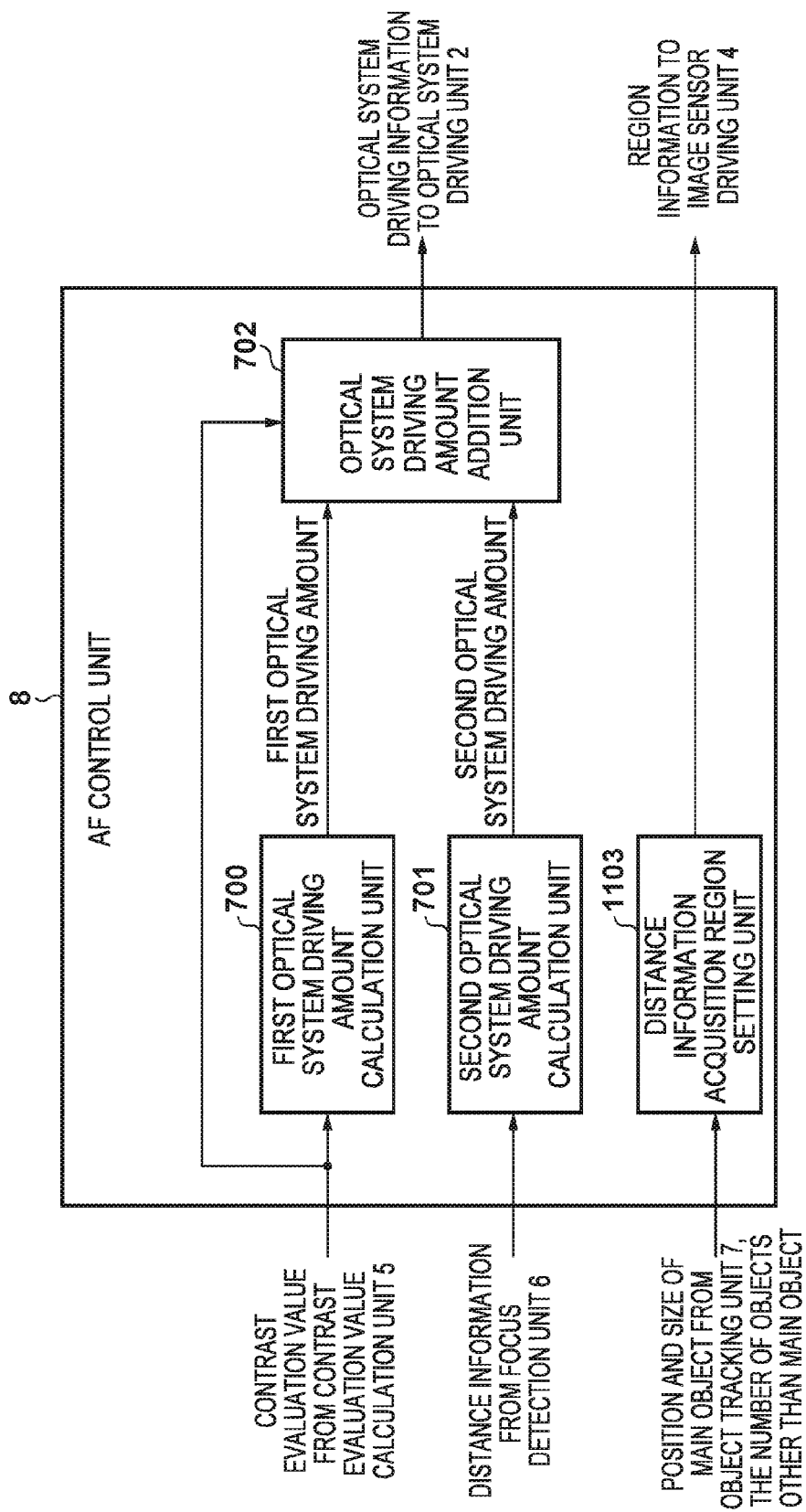
FIG. 11 is a diagram showing the configuration of an AF control unit of a second embodiment.

In the first embodiment, the region setting unit 703 controls the ratio of frames in which a distance information acquisition region for AF control is set and the ratio of frames in which distance information acquisition regions for object detection are set, based on the contrast evaluation value. In contrast, in the second embodiment, a distance information acquisition region setting unit (hereinafter, region setting unit) 1103 in FIG. 11 controls the ratio for a distance information acquisition region for AF control and the ratio for distance information acquisition regions for object detection, based on the number of objects other than a main object.

Note that in the second embodiment, the same reference numerals are assigned to constituent elements similar to those of the first embodiment, and description thereof is omitted. Differences from the first embodiment are that the object tracking unit 7 detects the number of objects in a captured image based on image signals from the image sensor 3 and distance information from the focus detection unit 6, and outputs the detected number of objects to the AF control unit 8, and that the AF control unit 8 controls the ratio for a distance information acquisition region for AF control and the ratio for distance information acquisition regions for object detection, based on the number of objects from the object tracking unit 7.

Figure 12:
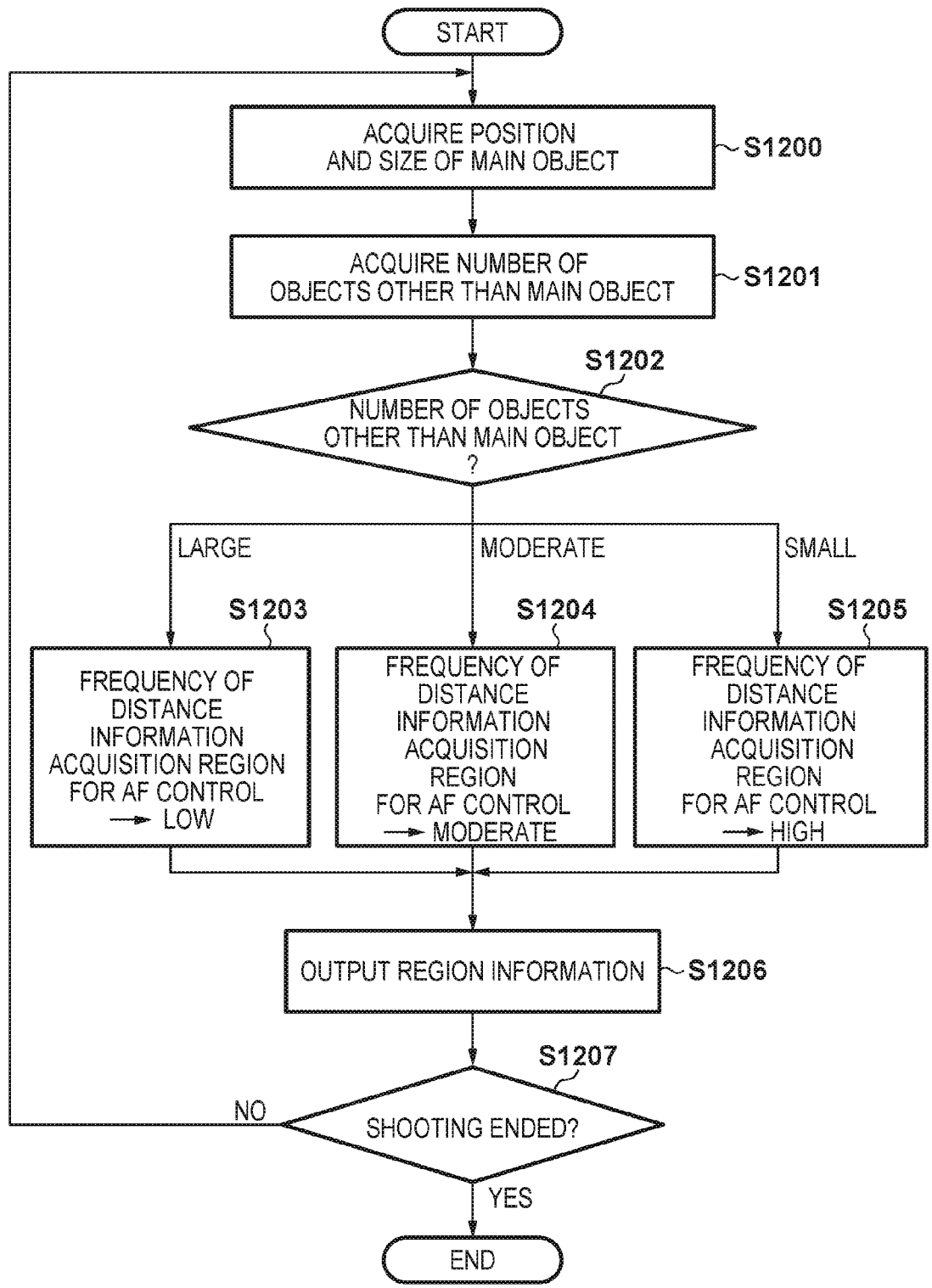
FIG. 12 is a flowchart showing processing for setting a distance information acquisition region performed by a distance information acquisition region setting unit of the second embodiment.

First, processing for outputting region information to the image sensor driving unit 4 at the time of AF control during a shooting operation, performed by the region setting unit 1103 of the AF control unit 8, will be described with reference to FIG. 12.

In step S1200, the region setting unit 1103 acquires object information (position and size) of a main object from the object tracking unit 7.

In step S1201, the region setting unit 1103 acquires the number of objects other than the main object from the object tracking unit 7.

In step S1202, the region setting unit 1103 determines whether the number of objects other than the main object acquired in step S1201 is large, small or moderate. The region setting unit 1103 uses thresholds Th3 and Th4 (Th3<Th4) to determine that the number of objects other than the main object is small if the number of objects other than the main object is smaller than the threshold Th3, determine that the number of objects other than the main object is moderate if the number of objects other than the main object is greater than the threshold Th3 and smaller than the threshold Th4, and determine that the number of objects other than the main object is large if the number of objects other than a main object is greater than the threshold Th4. The procedure then advances to step S1203 if it is determined that the number of objects other than the main object is small, the procedure advances to step S1204 if it is determined that the number of objects other than the main object is moderate, and the procedure advances to step S1205 if it is determined that the number of objects other than the main object is large.

In this embodiment, the number of objects other than a main object serves as a determination condition because the greater the number of objects other than the main object is, the higher the possibility becomes that an object other than the main object passes in front of the main object, and thus a possibility that determination of the main object using distance information is required becomes higher.

In step S1203, if the number of objects other than the main object is large, the region setting unit 1103 performs region setting so as to decrease the frequency of frames in which the distance information acquisition region for AF control 1002 is set, and to increase the frequency of frames in which distance information acquisition regions for object detection are set, similar to FIG. 10C.

In step S1204, if the number of objects other than the main object is moderate, the region setting unit 1103 performs region setting such that the frequency of frames in which the distance information acquisition region for AF control 1002 is set is higher than in FIG. 10C, and is lower than in FIG. 10A, similarly to FIG. 10B.

In step S1205, if the number of objects other than the main object is small, the region setting unit 1103 performs region setting so as to further increase the frequency of frames in which the distance information acquisition region for AF control 1002 is set, similarly to FIG. 10A.

In step S1206, the region setting unit 1103 calculates region information according to the setting frequency of the distance information acquisition region for AF control set in steps S1203 to S1205, and outputs the region information to the image sensor driving unit 4.

In step S1207, the region setting unit 1103 determines whether or not the shooting operation has ended, using, as a trigger, an instruction to end the shooting from the user via the operation unit 12 or the like, and repeats the processing from step S1200 until it is determined that the operation has ended.

According to this embodiment, the ratio of frames in which a distance information acquisition region for AF control is set and the ratio of frames in which distance information acquisition regions for object detection are set are variably controlled according to the number of objects other than a main object at the time of AF control during image shooting. This makes it possible to ensure both AF control accuracy and main object tracking accuracy.

Note that in the above embodiment, a distance information acquisition region for AF control is set based on the number of objects other than a main object, but a configuration may be adopted in which the movement vector of an object other than the main object is detected, and if it is determined that a possibility is high that the object other than the main object passes in front of the main object, the ratio for the distance information acquisition region for AF control is decreased, and if it is determined that a possibility is low that the object other than the main object passes in front of the main object, the ratio for the distance information acquisition region for AF control is increased.

Third Embodiment

Next, a third embodiment will be described.

In the first embodiment, the region setting unit 703 controls the ratio of frames in which a distance information acquisition region for AF control is set and the ratio of frames in which distance information acquisition regions for object detection are set, based on a contrast evaluation value. In contrast, in the third embodiment, the region setting unit 703 sets the priority of a distance information acquisition region for AF control in a frame, based on a contrast evaluation value. The region setting unit 703 then controls the ratio for a distance information acquisition region for AF control and the ratio for distance information acquisition regions for object detection that are arranged in a frame, using ratios that are based on the priority that has been set.

Note that in the third embodiment, the same reference numerals are assigned to constituent elements similar to those in the first embodiment, and description thereof is omitted.

Figure 13:
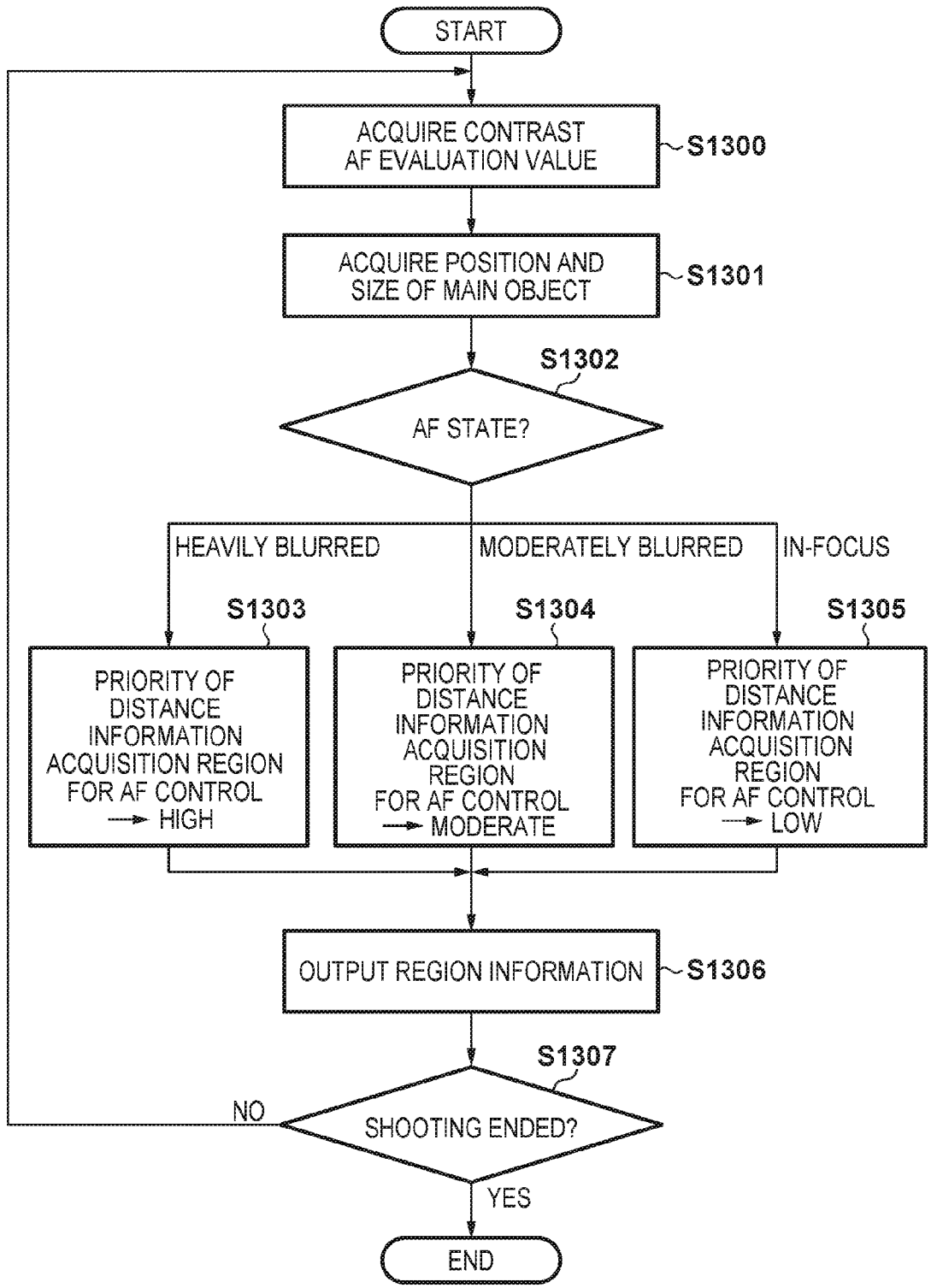
FIG. 13 is a flowchart showing processing for setting a distance information acquisition region performed by a distance information acquisition region setting unit of a third embodiment.

Processing for outputting region information to the image sensor driving unit 4 at the time of AF control during a shooting operation, performed by the region setting unit 703 of the AF control unit 8, will be described below with reference to FIG. 13. Note that steps S1300 to S1302 in FIG. 13 are similar to steps S900 to S902 in FIG. 9, and thus description thereof is omitted.

Here, processing for setting a priority for a distance information acquisition region in steps S1303 to S1305 in FIG. 13 will be described in detail with reference to FIGS. 14A to 14C.

Figure 14:
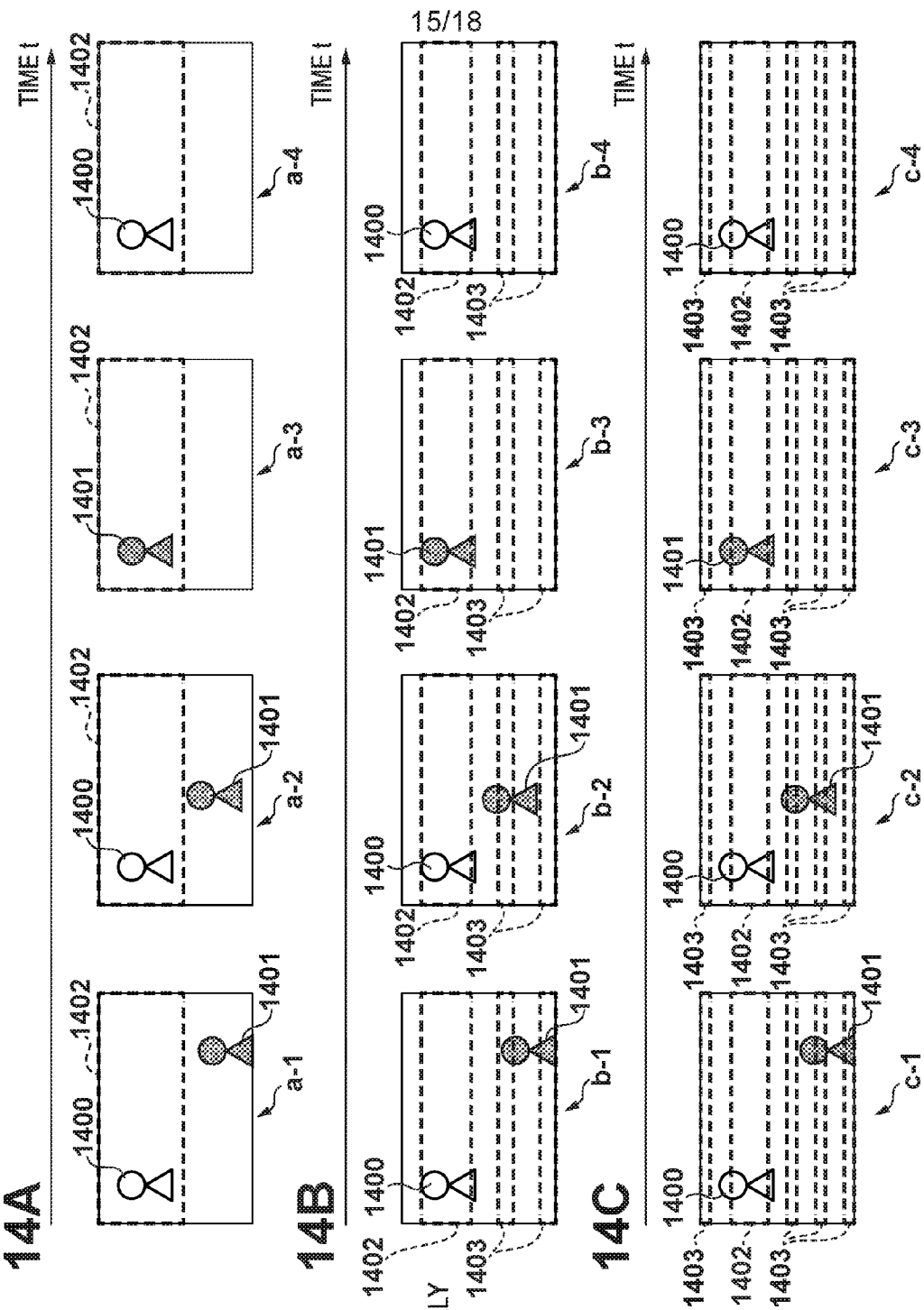
FIGS. 14A to 14C are diagrams illustrating distance information acquisition regions that are set by the region setting unit of the third embodiment.

In FIGS. 14A to 14C, reference numeral 1400 denotes a main object, reference numeral 1401 denotes an object other than the main object, and reference numeral 1402 denotes a distance information acquisition region for AF control. Also, reference numeral 1403 denotes a distance information acquisition region for object detection. Moreover, FIG. 14A illustrates an example of region setting in a heavily blurred state (step S1303), FIG. 14B illustrates an example of region setting in a moderately blurred state (step S1304), and FIG. 14C illustrates an example of region setting in an in-focus state (step S1305).

In the case of the heavily blurred state in step S1303, the region setting unit 703 performs region setting such that the priority of the distance information acquisition region for AF control 1402 is high. This increases the ratio for the distance information acquisition region for AF control 1402 arranged in a frame as in FIG. 14A, and enlarges the distance information acquisition region for AF control 1402.

In the case of the moderately blurred state in step S1304, the region setting unit 703 performs region setting such that the priority of the distance information acquisition region for AF control 1402 is moderate. In the moderately blurred state in FIG. 14B, the ratio for the distance information acquisition region for AF control 1402 arranged in a frame is smaller compared to the heavily blurred state in FIG. 14A, but the distance information acquisition regions for object detection 1403 are set so as to be relatively small but discrete over the entire screen.

The AF state in step S1305 is an in-focus state, and thus the region setting unit 703 performs region setting so as to lower the priority of a distance information acquisition region for AF control. In the in-focus state in FIG. 14C, the ratio for the distance information acquisition region for AF control 1402 in the frame is even smaller compared to the moderately blurred state in FIG. 14B, but the distance information acquisition regions for object detection 1403 are set to be relatively large and discrete over the entire screen.

In step S1306, the region setting unit 703 calculates region information according to the priority of the distance information acquisition region for AF control set in steps S1303 to S1305, and outputs the region information to the image sensor driving unit 4.

In step S1307, the region setting unit 703 determines whether or not the shooting operation has ended, using, as a trigger, an instruction to end the shooting from the user via the operation unit 12 or the like, and repeats the processing from step S1300 until it is determined that the operation has ended.

According to this embodiment, the ratio for a distance information acquisition region for AF control and the ratio for distance information acquisition regions for object detection that are arranged in a frame are controlled according to the AF state at the time of AF control during image shooting. This makes it possible to ensure both AF control accuracy and main object tracking accuracy.

Note that in the embodiment above, a distance information acquisition region for AF control is set based on object information (position and size) of a main object, but may be set according to the AF mode or an object designated by the user. Moreover, the AF state is determined based on a contrast evaluation value, but may be determined by the focus detection unit 6 using a phase difference method.

Fourth Embodiment

Next, a fourth embodiment will be described.

In the second embodiment, the region setting unit 1103 controls the ratio for a distance information acquisition region for AF control and the ratio for distance information acquisition regions for object detection, based on the number of objects other than a main object. In contrast, in the fourth embodiment, a region setting unit 1103 sets the priority of a distance information acquisition region for AF control in a frame based on the number of objects other than a main object. The region setting unit 1103 then controls the ratio for a distance information acquisition region for AF control and the ratio for distance information acquisition regions for object detection that are arranged in the frame, using ratios that are based on the set priority.

Note that in the fourth embodiment, the same reference numerals are assigned to constituent elements similar to those in the second embodiment and description thereof is omitted.

Figure 15:
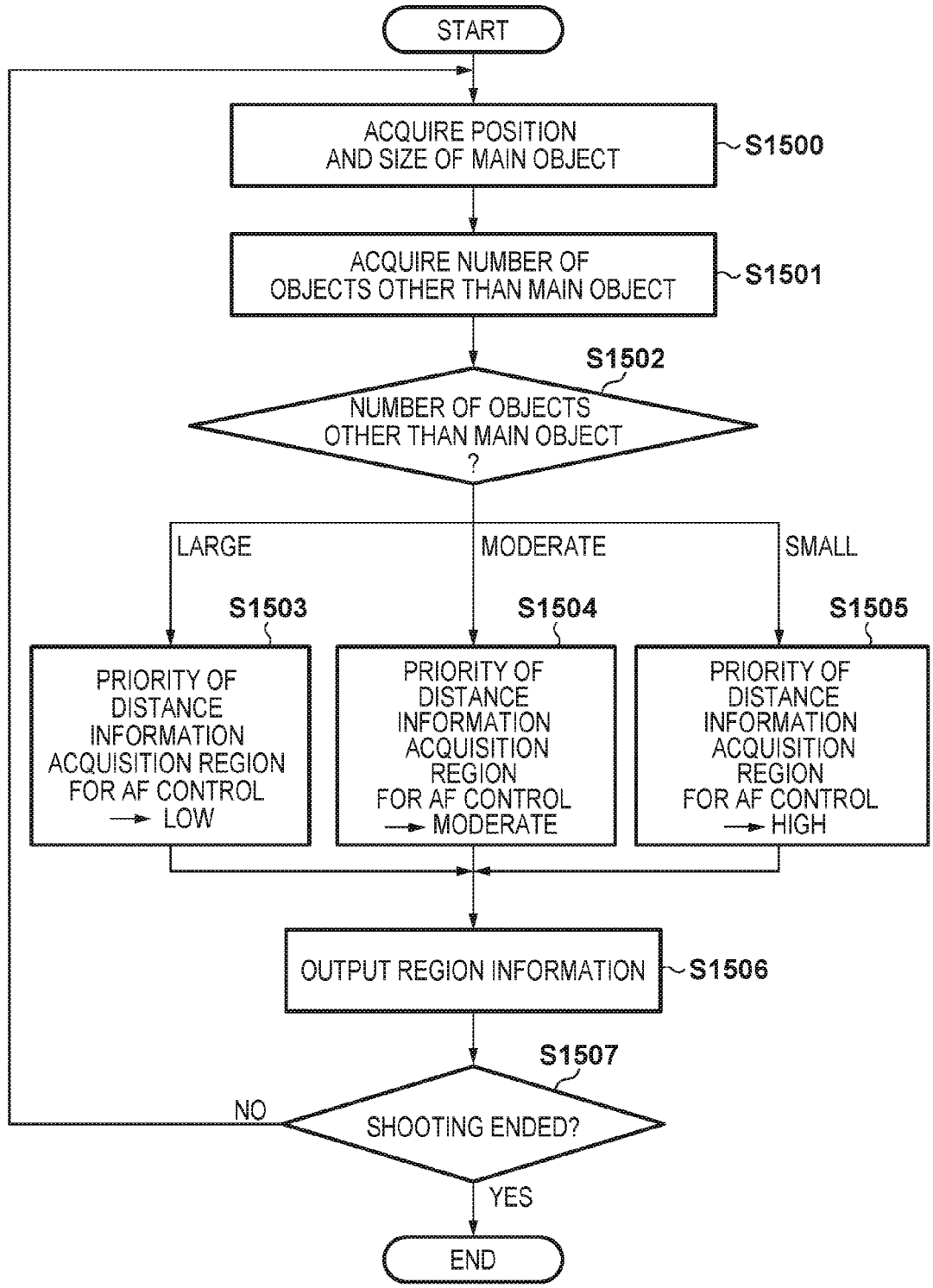
FIG. 15 is a flowchart showing processing for setting a distance information acquisition region performed by a distance information acquisition region setting unit of a fourth embodiment.

Processing for outputting region information to an image sensor driving unit 4 at the time of AF control during a shooting operation, performed by a region setting unit 1103 of an AF control unit 8, will be described below with reference to FIG. 15. Note that steps S1500 to S1502 in FIG. 15 are similar to steps S1200 to S1202 in FIG. 12, and thus description thereof is omitted.

In step S1502, the region setting unit 1103 determines whether the number of objects other than a main object acquired in step S1501 is large, moderate or small. The region setting unit 1103 uses thresholds Th3 and Th4 (Th3<Th4) to determine that the number of objects other than the main object is small if the number of objects other than the main object is smaller than the threshold Th3, determine that the number of objects other than the main object is moderate if the number of objects other than the main object is greater than the threshold Th3 and smaller than the threshold Th4, and determine that the number of objects other than the main object is large if the number of objects other than the main object is greater than the threshold Th4. Subsequently, the procedure advances to step S1503 if it is determined that the number of objects other than the main object is small, the procedure advances to step S1504 if it is determined that the number of objects other than the main object is moderate, and the procedure advances to step S1505 if it is determined that the number of objects other than the main object is large.

In this embodiment, the number of objects other than a main object is determined because the greater the number of objects other than the main object is, the more the possibility increases that an object other than the main object passes in front of the main object, and thus a possibility that determination of the main object using distance information is required becomes higher.

In step S1503, if the number of objects other than the main object is large, the region setting unit 1103 performs region setting such that the priority of a distance information acquisition region for AF control becomes low. Accordingly, similarly to FIG. 14C, a distance information acquisition region for AF control 1402 in the frame becomes smaller, but distance information acquisition regions for object detection 1403 are set to be relatively large and discrete over the entire screen.

In step S1504, if the number of objects other than the main object is moderate, the region setting unit 1103 performs region setting such that the priority of the distance information acquisition region for AF control 1402 is moderate. Accordingly, similarly to FIG. 14B, the distance information acquisition region for AF control 1402 in the frame becomes smaller, but the distance information acquisition regions for object detection 1403 are set to be relatively small but discrete over the entire screen.

In step S1505, if the number of objects other than the main object is small, the region setting unit 1103 performs region setting such that the priority of the distance information acquisition region for AF control 1402 is high. This enlarges the distance information acquisition region for AF control 1402 in the frame, similarly to FIG. 14A.

In step S1506, the region setting unit 1103 calculates region information according to the priority of setting a distance information acquisition region for AF control set in steps S1503 to S1505, and outputs the region information to the image sensor driving unit 4.

In step S1507, the region setting unit 1103 determines whether or not the shooting operation has ended, using, as a trigger, an instruction to end the shooting from the user via an operation unit 12 or the like, and repeats the processing from step S1500 until it is determined that the operation has ended.

According to this embodiment, the ratio for a distance information acquisition region for AF control and the ratio for distance information acquisition regions for object detection that are arranged in a frame are controlled according to the number of objects other than a main object at the time of AF control during image shooting. This makes it possible to ensure both AF control accuracy and main object tracking accuracy.

Note that in the embodiment above, a distance information acquisition region for AF control is set based on the number of objects other than a main object, but a configuration may be adopted in which the movement vector of an object other than a main object is detected, and the ratio for a distance information acquisition region for AF control is lowered if it is determined that a possibility that the object other than the main object passes in front of the main object is high, and the ratio is increased if it is determined that the possibility is low.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-086574, filed Apr. 22, 2016 which is hereby incorporated by reference herein in its entirety.

What is claimed is:

1. An image capturing apparatus comprising:
    an image sensor;
    a readout circuit configured to read out a signal from pixels of the image sensor; and
    at least one processor, configured to function as:
        a setting unit configured to set a region in which a plurality of signals having different viewpoints are read out from each pixel of the image sensor by the readout circuit,
        a first information acquisition unit configured to acquire first depth information for detecting an object using a signal that has been read out from a first region set by the setting unit,
        a second information acquisition unit configured to acquire second depth information for detecting a focus state of the object using a signal that has been read out from a second region set by the setting unit, and
        a control unit configured to variably control a ratio of frames in which the first region is set by the setting unit and frames in which the second region is set by the setting unit.

2. The apparatus according to claim 1, wherein said at least one processor is further configured to function as:
    an object detection unit configured to detect an object based on the first depth information, and to detect a specific object among detected objects, and
    a focus adjustment unit configured to determine a focus state of the specific object based on the second depth information, and to perform focus adjustment so as to bring the specific object into an in-focus state.

3. The apparatus according to claim 2, wherein the first region is a region that is discretely arranged over the entire screen and is set for object detection performed by the object detection unit, and the second region is a region that is locally arranged on the screen and is set for focus adjustment performed by the focus adjustment unit.

4. The apparatus according to claim 2, wherein said at least one processor is further configured to function as:
a third information acquisition unit configured to acquire evaluation information for detecting a focus state of an object using a signal that has been read out by the readout circuit, and
wherein the closer the evaluation information is to the in-focus state, the lower the setting unit sets the ratio for the second region, and the farther the evaluation information is from the in-focus state, the higher the setting unit sets the ratio for the second region.

5. The apparatus according to claim 4, wherein the closer the evaluation information is to the in-focus state, the lower the setting unit sets a frequency at which the second region is set, and the farther the evaluation information is from the in-focus state, the higher the setting unit sets the frequency at which the second region is set.

6. The apparatus according to claim 4, wherein the closer the evaluation information is to the in-focus state, the lower the setting unit sets a priority of the second region, and the farther the evaluation information is from the in-focus state, the higher the setting unit sets the priority of the second region.

7. The apparatus according to claim 4, wherein the first depth information and the second depth information are information regarding an object distance acquired by performing correlation calculation on the signals having different viewpoints, and
the evaluation information is information regarding an object contrast acquired from a signal acquired by adding together the signals having different viewpoints.

8. The apparatus according to claim 7, wherein the object detection unit detects information regarding a position and a size of the specific object, and
the setting unit sets the first region and the second region based on the information regarding the position and the size of the specific object and the information regarding the contrast.

9. The apparatus according to claim 4, wherein
the focus adjustment unit has a driving amount calculation unit configured to calculate, based on the second depth information and the evaluation information, optical system driving information for driving an optical system so as to bring the specific object into the in-focus state, and
the driving amount calculation unit calculates the optical system driving information by weighting a first driving amount calculated from the evaluation information and a second driving amount calculated from the second depth information.

10. The apparatus according to claim 9, wherein
the closer the evaluation information is to an in-focus state, the higher the driving amount calculation unit sets a weight of the first driving amount, and the farther the evaluation information is from the in-focus state, the lower the driving amount calculation unit sets a weight of the second driving amount.

11. The apparatus according to claim 2, wherein the larger the number of objects other than the specific object is, the lower the setting unit sets the ratio for the second region, and the smaller the number of objects other than the specific object is, the higher the setting unit sets the ratio for the second region.

12. The apparatus according to claim 11, wherein the larger the number of objects other than the specific object is, the lower the setting unit sets a frequency at which the second region is set, and the smaller the number of objects other than the specific object is, the higher the setting unit sets the frequency at which the second region is set.

13. The apparatus according to claim 11, wherein the larger the number of objects other than the specific object is, the lower the setting unit sets a priority of the second region, and the smaller the number of objects other than the specific object is, the higher the setting unit sets the priority of the second region.

14. The apparatus according to claim 11, wherein the object detection unit detects information regarding a position and a size of the specific object, and the number of objects other than the specific object, and
the setting unit sets ratios for the first region and the second region based on the information regarding the position and the size of the specific object and the number of objects other than the specific object.

15. The apparatus according to claim 1, wherein
in the image sensor, a plurality of photoelectric conversion portions are assigned to one microlens.

16. An image capturing apparatus comprising:
an image sensor;
a readout circuit configured to read out a signal from pixels of the image sensor; and
at least one processor, configured to function as:
a setting unit configured to set a region in which a plurality of signals having different viewpoints are read out from each pixel of the image sensor by the readout circuit,
a first information acquisition unit configured to acquire first depth information for detecting an object using a signal that has been read out from a first region set by the setting unit,
a second information acquisition unit configured to acquire second depth information for detecting a focus state of the object using a signal that has been read out from a second region set by the setting unit, and
a control unit configured to variably control a ratio of the first region set in a frame by the setting unit and the second region set in the frame by the setting unit.

17. A control method of an image capturing apparatus which has an image sensor, a readout circuit configured to read out a signal from pixels of the image sensor, and at least one processor configured to function as a setting unit configured to set a region in which a plurality of signals having different viewpoints are read out from each pixel of the image sensor by the readout circuit, the method comprising:
acquiring first depth information for detecting an object using a signal that has been read out from a first region set by the setting unit;
acquiring second depth information for detecting a focus state of the object using a signal that has been read out from a second region set by the setting unit; and
variably controlling a ratio of frames in which the first region is set by the setting unit and frames in which the second region is set by the setting unit.

18. A control method of an image capturing apparatus which has an image sensor, a readout circuit configured to read out a signal from pixels of the image sensor, and at least one processor configured to function as a setting unit configured to set a region in which a plurality of signals having different viewpoints are read out from each pixel of the image sensor by the readout circuit, the method comprising:

acquiring first depth information for detecting an object using a signal that has been read out from a first region set by the setting unit;

acquiring second depth information for detecting a focus state of the object using a signal that has been read out from a second region set by the setting unit; and variably controlling a ratio of the first region set in a frame by the setting unit and the second region set in the frame by the setting unit.

19. A computer-readable storage medium storing a program for causing a computer to execute a control method of an image capturing apparatus which has an image sensor, a readout circuit configured to read out a signal from pixels of the image sensor, and at least one processor configured to function as a setting unit configured to set a region in which a plurality of signals having different viewpoints are read out from each pixel of the image sensor by the readout circuit, the method comprising:

acquiring first depth information for detecting an object using a signal that has been read out from a first region set by the setting unit;

acquiring second depth information for detecting a focus state of the object using a signal that has been read out from a second region set by the setting unit; and variably controlling a ratio of frames in which the first region is set by the setting unit and frames in which the second region is set by the setting unit.

20. A computer-readable storage medium storing a program for causing a computer to execute a control method of an image capturing apparatus which has an image sensor, a readout circuit configured to read out a signal from pixels of the image sensor, and at least one processor configured to function as a setting unit configured to set a region in which a plurality of signals having different viewpoints are read out from each pixel of the image sensor by the readout circuit, the method comprising:

acquiring first depth information for detecting an object using a signal that has been read out from a first region set by the setting unit;

acquiring second depth information for detecting a focus state of the object using a signal that has been read out from a second region set by the setting unit; and variably controlling a ratio of the first region set in a frame by the setting unit and the second region set in the frame by the setting unit.

* * * * *